(12) United States Patent
Vesterman et al.

(10) Patent No.: US 10,446,005 B1
(45) Date of Patent: Oct. 15, 2019

(54) NETWORK BASED REUNIFICATION MANAGEMENT USING PORTABLE DEVICES

(71) Applicant: Raptor Technologies LLC, Houston, TX (US)

(72) Inventors: James J. Vesterman, Houston, TX (US); Gary Kincade, Houston, TX (US); David Van Camp, Houston, TX (US); Peter J. Trate, Fresno, TX (US)

(73) Assignee: Raptor Technologies LLC, Houston, TX (US)

( * ) Notice: Subject to any disclaimer, the term of this patent is extended or adjusted under 35 U.S.C. 154(b) by 0 days.

(21) Appl. No.: 16/208,032

(22) Filed: Dec. 3, 2018

Related U.S. Application Data

(63) Continuation of application No. 15/298,948, filed on Oct. 20, 2016, now Pat. No. 10,176,692.

(60) Provisional application No. 62/244,619, filed on Oct. 21, 2015.

(51) Int. Cl.
*G08B 1/08* (2006.01)
*G08B 21/02* (2006.01)

(52) U.S. Cl.
CPC ................. *G08B 21/0205* (2013.01)

(58) Field of Classification Search
CPC .................. G06Q 10/00; G06F 1/00
See application file for complete search history.

(56) References Cited

U.S. PATENT DOCUMENTS

| | | | |
|---|---|---|---|
| 7,468,658 B2 | 12/2008 | Bouressa | |
| 8,120,505 B2 | 2/2012 | Bouressa | |
| 8,907,763 B2 | 12/2014 | Pineau et al. | |
| 8,941,474 B2 | 1/2015 | Mitchell | |
| 2006/0118636 A1 | 6/2006 | Miles et al. | |
| 2010/0262367 A1* | 10/2010 | Riggins | G06Q 10/10 701/533 |
| 2010/0282839 A1 | 11/2010 | Zura et al. | |
| 2013/0162397 A1 | 6/2013 | Cano et al. | |
| 2014/0080519 A1* | 3/2014 | Ahmed | H04W 4/04 455/456.3 |
| 2016/0006870 A1* | 1/2016 | Merjanian | H04W 4/90 379/45 |

* cited by examiner

*Primary Examiner* — Shirley Lu
(74) *Attorney, Agent, or Firm* — Fish & Richardson P.C.

(57) ABSTRACT

Computing device(s) are configured for managing the reunification of students with parents during an emergency or a drill for a simulated emergency. The reunification of students with guardians may be managed through the operations of various user interfaces (UIs) presented on the device(s). Different UIs may be configured to support different personnel performing different roles in the reunification process. The UIs may include one or more of a student supervisor UI, a location supervisor UI, a runner UI, a guardian greeter UI, a reunification officer UI, or an incident commander UI. The various UIs enable different personnel to track the location and status of individuals, such as students and guardians, during various stages of a reunification process, enable personnel to dynamically update a centralized database with current information regarding the location and status of individuals, and view real time information regarding the location and status of individuals.

20 Claims, 30 Drawing Sheets

NETWORK BASED REUNIFICATION MANAGEMENT USING PORTABLE DEVICES

CROSS-REFERENCE TO RELATED APPLICATION

The present application is a continuation application and claims priority to U.S. patent application Ser. No. 15/298, 948, titled "Network Based Reunification Management Using Portable Devices," which was filed on Oct. 20, 2016, which claims priority to U.S. Provisional Patent Application Ser. No. 62/244,619, titled "Facilitating Reunification Using Portable Devices," which was filed on Oct. 21, 2015, the entirety of which is hereby incorporated by reference into the present application.

FIELD OF THE INVENTION

The present disclosure relates to facilitating the reunification of students with parents or other guardians during or following an emergency or other incident.

BACKGROUND

Recent decades have seen an unfortunate increase in emergency incidents at schools or other institutions. Traditional plans for responding to an emergency incident may rely on paper records and the accurate memory and focused attention of personnel on the scene. However, during the chaos and confusion of an emergency, paper records may be lost, destroyed, or corrupted, and personnel may become distracted or forgetful. Moreover, personnel on the scene may be emergency responders who may not be familiar with the students or others in need of assistance, leading to further confusion and misidentification of individuals. In a traditional emergency response, the absence of up-to-date, accurate information may lead to the loss or injury of students or others in need of assistance.

SUMMARY

Several aspects of the invention feature managing the reunification of students with parents or other guardians during an emergency or a drill scenario, through the operations of various user interfaces (UIs) presented by one or more applications executing on computing devices such as portable computing devices. Different UIs may be configured to support different personnel performing different roles in the reunification of students with guardians. In some implementations, the UIs may include one or more of a student supervisor UI, a location supervisor UI, a runner UI, a guardian greeter UI, a reunification officer UI, or an incident commander UI. Various implementations may include different subsets of these UIs as appropriate to manage reunification for different types of emergencies, different emergency response scenarios, or drills. The various UIs enable different personnel to track the location and status of individuals such as students and guardians to be reunified, enable personnel to dynamically update a centralized database with current information regarding the location and status of individuals, such as students, staff, visitors, volunteers, contractors, and so forth, and view real time information regarding the location and status of such individuals. The various UIs, and/or subset(s) of UIs, also enable the different user types to view documents, including action plans, emergency plans, facility maps, and so forth, from their mobile device. Access to view documents may be performed with or without network connectivity to remote centralized databases. In some instances, the documents may provide checklists for the actions to be taken by personnel. The various UIs enable users to send notifications, messages, data, content, and other forms of media to each other, to support real-time incident management and communication. The system may also provide the ability to perform custody information checks, custom alert checks, as well as (e.g., nationwide) sex offender registry checks on individuals being reunified with students.

Some implementations provide a computer-implemented method for tracking an escort, e.g., by a runner, of one or more students to a destination location. The method includes presenting, in a UI executing on a computing device, a runner queue including one or more records. Each of the one or more records includes a name of a student and an escort status of the student. Based at least partly on detecting a first gesture made through the UI indicating a record of the one or more records, the presentation of the escort status of the record is altered to indicate that a runner is to escort the student to the destination location. Based at least partly on detecting a second gesture made through the UI indicating the record, the presentation of the escort status of the record is altered to indicate that the student is in transit. Based at least partly on detecting an additional gesture made through the UI indicating the record, the presentation of the status of the student record may be altered to indicate that the student is reunified with a guardian or is released to depart without a guardian.

Some embodiments include, based on detecting a third gesture indicating the record, presenting in the UI a confirmation dialog to confirm that the student has arrived at the destination location. Some aspects include, based at least partly on a fourth gesture made in the confirmation dialog, removing the record from the runner queue presented in the UI.

In some cases, the UI employs a graphic symbol, color indicator, text, and/or other UI element to represent the escort status of the student in the runner queue. In some aspects, the escort status is one of: a first escort status, indicating that the student is awaiting escort and no runner has been assigned to escort the student; a second escort status, indicating that the student is awaiting escort and the runner has been assigned to escort the student; a third escort status, indicating that the student is in transit; or a fourth escort status, indicating that the student is in reunified or released.

In some examples, the runner queue is stored on at least one storage device that is remote from the computing device. The runner queue may be arranged to be presented in multiple instances of the UI executing on multiple computing devices, to enable multiple runners to access the runner queue. The runner queue may be communicated to the multiple computing devices via at least one server computing device that is configured to access the at least one storage device.

Some embodiments include, responsive to detecting a selection of the record in the UI, presenting information indicating the runner assigned to escort the student corresponding to the record.

In some applications, prior to the detecting of the first gesture, the escort status of the record indicates that the student is awaiting escort and no runner has been assigned to escort the student.

Another aspect of the invention features a system for tracking an escort of one or more students to a destination location. The system includes at least one data store and at least one processor configured to execute computer-readable instructions that cause the at least one processor to perform operations. The operations include communicating at least a portion of a runner queue for presentation in a UI executing on a computing device. The runner queue is stored in the at least one data store. The runner queue includes one or more records each including a name of a student, escort status of the student, initiator of the reunification request, and/or a date/time indicator of when the request was generated. Responsive to receiving, from the computing device, a first communication caused by a first gesture made in the UI with respect to a record, the escort status of the record is updated to indicate that a runner is to escort the student corresponding to the record. The first communication may identify the runner. Responsive to receiving, from the computing device, a second communication caused by a second gesture made in the UI with respect to the record, the escort status of the record is updated to indicate that the student is in transit.

In some cases, the operations include, responsive to receiving, from the computing device, a third communication caused by a third gesture made in the UI with respect to the record, removing the record from the runner queue. In some aspects, the operations include, further responsive to receiving the third communication, adding a record for the student in a reunification queue stored in the at least one data store.

In some examples, the escort status is one of: a first escort status, indicating that the student is awaiting escort and no runner has been assigned to escort the student; a second escort status, indicating that the student is awaiting escort and the runner has been assigned to escort the student; a third escort status, indicating that the student is in transit; or a fourth escort status, indicating that the student is reunified with a guardian or released without a guardian.

In some circumstances, the operations include, communicating the runner queue to multiple computing devices each executing an instance of the UI, to enable multiple runners to access the runner queue.

In some embodiments, the operations include, prior to the receiving of the first communication, receiving an initial communication indicating that the student is to be escorted to a destination location. Responsive to the initial communication, the runner queue is updated to add the record corresponding to the student, the escort status of the record indicating that the student is awaiting escort and no runner has been assigned to escort the student as well as an indicator of who created the reunification request, and a date/time indicator of when the request was generated. In some aspects, the initial communication is received from a different computing device than the computing device, and the initial communication is caused by a gesture made in a different UI executing on the different computing device.

Another aspect of the invention features a system for managing reunification of one or more students with one or more guardians. The system includes at least one data store comprising student records. The system further includes a plurality of computing devices including a location supervisor device, a runner device, and a reunification officer device. In some implementations, the location supervisor device is at least configured to receive, through a location supervisor UI, data that identifies a student. The location supervisor device is further configured to determine a current location of the location supervisor device, which can include utilizing satellite-based navigation systems (e.g., the global positioning system (GPS)), geolocation, geo-fencing and/or other technologies to identify and process a user device's location and set appropriately. Responsive to receiving an input through the location supervisor UI, the location supervisor device is configured to check the student in to the current location, including sending a communication to cause a student record of the student to be updated to include the current location. Responsive to receiving an input through the location supervisor UI, the location supervisor device is configured to set a current status for the student, including sending a communication to cause the student record of the student to be updated to include the current status.

In some implementations, the reunification officer device and/or the runner device is at least configured to receive, through a guardian greeter UI, data that identifies a guardian and indicated whether the guardian is approved to pick-up the student, among other guardian identification details. The reunification officer device is further configured to present guardian information that includes a name of the student associated with the guardian. Responsive to an input to the guardian greeter UI, the guardian greeter device may send a communication to cause the name of the student to be added to a runner queue listing one or more students to be escorted to a reunification area, the communication further causing a reunification request to be added to a reunification queue, the reunification request including the name of the student, the name of the guardian, a reunification status, the name of the creator of the reunification request, and date/times associated to the creation process. The reunification officer device and/or the runner device may be further configured to present, in a reunification officer UI and/or a runner queue UI, at least a portion of a reunification queue including one or more reunification requests. Responsive to detecting a selection of the reunification request in the reunification officer UI, the reunification officer device may present the reunification request including the name of the student and the name of a guardian. Responsive to receiving an indication, through the reunification officer UI, of a reunification of the student with the guardian, the reunification officer device may send a communication to cause the reunification status of the reunification request to be altered to indicate the reunification of the student with the guardian.

In some examples, the plurality of computing devices further includes a student supervisor device that is at least configured to present, in a student supervisor UI, a roster of students described in at least a portion of the student records. Responsive to receiving, through the student supervisor UI, an indication of at least one of a location or a status of a student, the student supervisor device may send a communication to cause a student record of the student to be updated to include the at least one of the location or the status of the student. The status may include additional auxiliary information regarding the status of a student, indicating the reason why the status was chosen and notations describing the last seen instance of the student, absentee information, and/or injury- or health-related status. The status may include one or more of a transportation status, evacuation safe zone location status, lockdown room location status, shelter status location, secure perimeter location status, an accounted for status, indicator of that day's school attendance, and/or a health status of the student. The student supervisor device may be further configured to present, in the student supervisor UI, an updated roster of students including the at least one of the location or the status of the student.

In some cases, the student supervisor device is further configured to present student information responsive to a selection, in the student supervisor UI, of the student in the roster of students. The student information may include one or more of an image of the student, grade and/or teacher information for the student, a name of one or more guardians of the student that are approved for pick-up, emergency contact(s) that may or may not be approved for pick-up, the location of the student, the status of the student, and/or health information that may include known allergies, medical conditions, medical notes, medications, disabilities, or special needs. The student information may also include details regarding their reunification or release status as well as supporting details.

In some versions, the student supervisor device is further configured to present, in the student supervisor UI, a list of available locations. The at least one input may indicate the location as a selection of one of the available locations from the list of available locations.

In some examples, the student supervisor device is further configured to present, in the student supervisor UI, a list of available statuses. The at least one input may indicate the status as a selection of one of the available statuses from the list of available statuses.

In some embodiments, the location supervisor device is further configured to present, in the location supervisor UI, a list of available locations. Determining the current location may include detecting a selection of the current location from the list of available locations which may be a manual or automated process using geo-fencing, device GPS, or other technology to automate the location setting within the Location Supervisor UI.

In some applications, the data that identifies the student is an image of a student credential, the image captured using an image capture device of the location supervisor device. The location supervisor device may be further configured to scan the image of the student credential to determine an identity of the student. In some aspects, the student credential includes a barcode of one or more dimensions, the barcode encoding at least the identifier of the student. Scanning the image may include decoding the barcode to determine at least the identifier of the student.

In some cases, the location supervisor device is further configured to present student information including one or more of the name of the student, a grade of the student, an identification number of the student, and/or health information that may include known allergies, medical conditions, medical notes, medications, disabilities, or special needs. The student information may also include details regarding their reunification or release status as well as supporting details.

In some aspects, the plurality of computing devices further includes a guardian greeter device that is at least configured to receive, through the guardian greeter UI, data that identifies the guardian(s), including individual(s) that are approved for pick-up and/or individual(s) that are emergency contacts. The guardian greeter device may present, in the guardian greeter UI, guardian information that includes the name of the student associated with the guardian and may include details regarding the type of relationship, or related students. Responsive to an input to the guardian greeter UI, the guardian greeter device may send a communication to cause the name of the student or students to be added to a runner queue listing one or more students to be escorted to the reunification area, the communication further causing the reunification request to be generated and added to a reunification queue, the reunification request including the name of the student, the name of the guardian, type of relationship, name of the individual who generated the reunification request and a reunification status.

In some examples, the data that identifies the guardian is an image of a guardian credential, the image captured using an image capture device of the guardian greeter device. The guardian greeter device may be further configured to scan the image of the guardian credential to determine an identity of the guardian. In some aspects, the guardian credential includes a barcode of one or more dimensions, the barcode encoding at least an identifier of the guardian. Scanning the image may include decoding the barcode to determine at least the identifier of the guardian.

In some embodiments, the guardian information presented in the guardian greeter UI further includes one or more of: an image of the guardian; a relationship between the guardian and the student; a date of birth of the guardian; a name of the guardian; a name of one or more other students associated with the guardian; or an identification number associated with the guardian.

In some cases, the guardian greeter device is further configured to present, in the guardian greeter UI, a control to indicate that an identity of the guardian is verified. The sending of the communication to cause the name of the student to be added to the runner queue may be further based on detecting a gesture made with respect to the control to indicate that the identity of the guardian is verified.

In some implementations, the plurality of computing devices further includes a runner device that is at least configured to present, in a runner UI, at least a portion of the runner queue including, for each of one or more students, a name and an escort status of the student. Responsive to detecting, in the runner UI, a first gesture indicating the student in the runner queue, the runner device may send a communication to cause the escort status of the student to be altered to indicate that a runner is to escort the student to the reunification area. Responsive to detecting, in the runner UI, a second gesture indicating the student in the runner queue, the runner device may send a communication to cause the escort status of the student to be altered to indicate that the student is in transit to the reunification area. Responsive to detecting, in the runner UI, a third gesture indicating the student in the runner queue, the runner device may send a communication to cause the name of the student to be removed from the runner queue, to indicate that the student has been reunified with a guardian, and/or to indicate that the student has been released without a guardian being present.

In some examples, the escort status is graphically depicted or otherwise presented in the runner UI, to show the status of the request as: a first escort status, indicating that the student is awaiting escort and no runner has been assigned to escort the student to the reunification area; a second escort status, indicating that the student is awaiting escort and a runner has been assigned to escort the student; a third escort status, indicating that the student is in transit to the reunification area; or a fourth escort status, indicating that the student is reunified with a guardian or released without a guardian.

In some cases, the indication of the reunification of the student with the guardian includes a signature of the guardian provided through the reunification officer UI.

In some versions, the system further includes an incident commander device configured to present, in an incident commander UI, one or more dashboards. The dashboard(s) may include a status dashboard listing a proportion of students, staff, visitors, volunteers, contractors or other individuals that may be participating in the incident in each of one or more status categories. The dashboard(s) may include a location dashboard listing a number of students, staff, visitors, volunteers, contractors or other individuals that may be participating in the incident, at each of one or more locations. The dashboard(s) may include a reunification dashboard listing a number of students that have yet to be reunified, a number of students in the reunification queue, a number of students in a runner queue, and/or a number of students who have been reunified with a guardian. In some aspects, the one or more status categories include one or more of: a status of missing; a status of unknown; a status of injured; a status of accounted for; or a status of reunified.

In some examples, students may be authorized to depart the area without a guardian. In this release process, a student may be checked out by personnel using the reunification officer UI and/or other UIs, to indicate that the student has been released on their own recognizance without having a guardian present. The personnel may use the UI to note the identity of the released student, the reason they were released, the date/time when they were released, their destination following release, and/or other information. Such information may be stored and accessed by personnel.

In some examples, the incident commander device is remote from the student supervisor device, the location supervisor device, the guardian greeter device, the runner device, and the reunification officer device. The incident commander device may be further configured to communicate, over at least one network, with at least one server computing device that is configured to access the plurality of student records in the at least one data store.

In some embodiments, the system further includes at least one server computing device configured to communicate, over at least one network, with the location supervisor device and the reunification officer device, and access the at least one data store and update the student records.

In some examples, the plurality of computing devices includes an application. The application may be configured to present, based on a role of a user logged into the application, at least one of the location supervisor UI, the student supervisor UI, the runner queue UI, the reunification officer UI, or the incident commander UI.

In some cases, one or more of the plurality of computing devices is configured to operate in an off-line mode when a network is unavailable. The off-line mode may include accessing and presenting cached data previously retrieved from the at least one data store and stored on the one or more of the plurality of computing devices.

In some cases, at least one of the plurality of computing devices is a portable computing device.

Another aspect of the invention features a computer-implemented method for providing a reunification request to reunify a guardian with a student, the method includes receiving, through a UI executing on a computing device, identification data associated with the guardian. The method includes sending a request for guardian information to at least one server device, the request including at least a portion of the identification data. Responsive to receiving the guardian information from the at least one server device, the guardian information may be presented in the UI, the guardian information including a name of the student associated with the guardian. Responsive to an input to the UI, a communication may be sent to cause the reunification request to be added to a reunification queue, the reunification request specifying the student and the guardian.

In some embodiments, responsive to the input to the UI, a communication is sent to cause the name of the student to be added to a runner queue listing one or more students to be escorted to a reunification area.

In some examples, the identification data includes an image of a guardian credential, the image captured using an image capture device of the computing device. The method may further include scanning the image of the guardian credential to determine an identity of the guardian. In some aspects, the guardian credential includes a barcode of one or more dimensions, the barcode encoding at least the name of the guardian. Scanning the image may include decoding the barcode to determine at least the name of the guardian.

In some cases, the guardian information further includes one or more of: an image of the guardian; a relationship between the guardian and the student; an indication of whether the guardian is approved for pick-up, an indication whether they are an emergency contact, a date of birth of the guardian; a name of the guardian; a name of one or more other students associated with the guardian; an identification number associated with the guardian; or custodial information associated with the guardian.

In some implementations, the method further comprises presenting, in the UI, a control to indicate that an identity of the guardian is verified. The sending of the communication to cause the reunification request to be added to the reunification queue may be further based on detecting a gesture made with respect to the control to indicate that the identity of the guardian is verified.

Another aspect of the invention features a system for providing guardian information. The system includes at least one data store and at least one processor configured to execute computer-readable instructions that cause the at least one processor to perform various operations. The operations include receiving, from a computing device, student identification data for a student, the student identification data entered through a UI executing on the computing device. Based on the student identification data, guardian identification data is determined for a guardian associated with the student. The operations further include retrieving, from the at least one data store, guardian information corresponding to the identification data. The guardian information is sent to the computing device for presentation in the UI, the guardian information including a name of the student associated with the guardian and an indication of whether the guardian is approved to pick-up the student.

In some embodiments, the guardian information further includes one or more of: an image of the guardian; a relationship between the guardian and the student; a date of birth of the guardian; a name of the guardian; a name of one or more other students associated with the guardian; an identification number associated with the guardian; and/or an indication of whether the guardian is approved for pick-up or is an emergency contact.

In some examples, responsive to receiving a subsequent communication from the computing device, a reunification request is added to a reunification queue. The reunification request specifies the student and the guardian, and the subsequent communication indicates a verification of an identity of the guardian as well as information identifying the user who generated the reunification request, and date/time of the request generation.

In some cases, responsive to receiving a subsequent communication from the computing device, the student or students is added to a runner queue listing one or more students to be escorted to a reunification area, the date/time of when the reunification request was generated, and/or an identification of the user who generated the reunification request. In some instances, the subsequent communication indicates a verification of an identity of the guardian.

Another aspect of the invention features a system for sending notifications. The system includes at least one data store and at least one processor configured to execute computer-readable instructions that cause the at least one processor to perform various operations. The operations include presenting, in a UI, a plurality of available notifications each describing a status of an incident. The plurality of available notifications includes one or more previously written notifications. The operations further include detecting a first gesture made in the UI to indicate a notification from the plurality of available notifications. The operations further include presenting, in the UI, the option to include a plurality of available recipient groups to receive the notification. The operations further include detecting at least one second gesture made in the UI to either indicate at least one recipient group from the plurality of available recipient groups or the option to send to all users associated to the active incident. The operations further include sending the notification to the at least one recipient group or all users associated to the active incident.

In some examples, the plurality of available recipient groups includes one or more of: student supervisors; location supervisors; guardian greeters; runners; reunification officers; or incident command personnel.

In some implementations, the operations further include presenting a preview control in the UI. Responsive to detecting a third gesture indicating the previous control, a preview of at least one of the plurality of available notifications is presented.

In some aspects, the operations further include receiving, through a text entry dialog of the UI, a custom notification, and sending the custom notification to the at least one recipient group or to all users associated to the active incident.

In some cases, one or more of the plurality of available notifications are customized for one or more of an emergency or a drill or can further be customized by emergency or drill sub-type.

Another aspect of the invention features a system for presenting information in a UI. The system includes at least one data store and at least one processor configured to execute computer-readable instructions that cause the at least one processor to perform various operations. The operations may include sending, to at least one remote server device, a request for incident information including status information for one or more students, staff, visitors, volunteers, contractors, or other persons involved in the incident. The operations may include receiving the incident information from the at least one remote server device in response to the request. The operations may include determining, based on the status information, at least one or more of a proportion of students, staff, visitors, volunteers, contractors or other persons, in each of one or more status categories. The operations may include presenting in a status dashboard of the UI, the at least one of the proportion of students, staff, visitors, volunteers, vendors, or other persons in each of the one or more status categories.

In some examples, the one or more status categories include one or more of: a status of missing; a status of unknown; a status of injured; a status of accounted for; a status of reunified or released.

In some cases, the incident information further includes location information for one or more students or staff. The operations may further include determining, based on the location information, at least one of a proportion of students and staff or a number of students and staff at each of one or more locations. The operations may further include presenting, in a location dashboard of the UI, the at least one of the proportion of students or the number of students at each of the one or more locations.

In some embodiments, the operations further include presenting, in a visitor/volunteer/vendor/other person's dashboard of the UI, information describing one or more visitors, volunteers, vendors, and/or other persons currently present in an incident area, the information received from a visitor management system.

In some implementations, the incident information further includes reunification information for one or more students. The operations may further include determining, based on the reunification information, at least one of a proportion of students or a number of students in each of one or more reunification status categories. The operations may further include presenting, in a reunification dashboard of the UI, the at least one of the proportion of students or the number of students in each of the one or more reunification status categories. In some aspects, the one or more reunification status categories include one or more of: a status of not yet reunified, a status of in a reunification queue; a status of in a runner queue; a status of reunified; and/or a status of waiting for a runner in a holding area.

Another aspect of the invention features a system for facilitating a simulated reunification of a guardian with a student. The system includes at least one data store including a plurality of student records and at least one processor configured to execute computer-readable instructions that cause the at least one processor to perform various operations. The operations include generating a reunification request specifying the student and the guardian of the student. The operations further include adding the reunification request to a reunification queue. The operations further include communicating the reunification queue to a reunification officer device to cause the reunification queue to be presented in a reunification officer UI executing on the reunification officer device. Responsive to receiving, from the reunification officer device, a communication indicating the simulated reunification of the student with the guardian, the reunification request is removed from the reunification queue. The operations further include modifying one of the plurality of student records associated with the student to indicate that the student has been reunified with the guardian.

In some examples, based at least partly on the reunification request, a runner request is added to a runner queue, the runner request indicating that the student is to be escorted to a reunification area. The runner queue is communicated to one or more runner devices to cause the runner queue to be presented in a runner UI executing on each of the one or more runner devices. The operations may further include receiving, from one of the one or more runner devices, a communication indicating that a runner has escorted the student to the reunification area.

In some embodiments, generating the reunification request further includes, e.g., in a drill and/or test scenario, randomly selecting a student record from the plurality of student records, determining the student associated with the student record, and determining the guardian of the student as indicated by the student record.

Another aspect of the invention features a system for facilitating the release of students through a controlled manner utilizing mobile technologies and various UI screens. The release process tracks the controlled release process of allowing students to leave a school or campus when they are approved for such a release. The process tracks systematically which students are being released, through which method are they being released, documenting and tracking information about the release, as well as tracking the user who released the student, information about the incident that caused the release process, and allows for future reporting of the release process.

In some implementations, the system can be configured to enable the real-time collection of status information during an emergency, drill, or other scenario, such as information regarding the location and status of individuals (e.g., students) being assisted during an emergency or drill. Such information can be presented to personnel to enable the personnel to direct actions to assist individuals. The information may be employed to facilitate the reunification of students with their parents or other guardians, in a manner that is safe, controlled, and that ensures no unauthorized personnel gain access to students. The information may also be employed to facilitate the release of students in an approved and efficient manner that tracks and stores the details related to the student release process. In some cases, information collected during an emergency response or drill is stored for analysis after the emergency response or drill is completed. For example, the information collected in real time during an emergency or drill may be analyzed to evaluate the emergency response or drill effort, determine which aspects of the emergency response or drill were successful, which aspects were unsuccessful, and which aspects may be improved.

To test the system and its various application(s), and/or to comply with government (e.g., Federal and/or State) mandates for performing drills, implementations may include a Drill Management feature. The Drill Management feature enables administrators and emergency managers to configure and set their district's drilling requirements and configure those to buildings/schools within their district. Configuring of drills may include specifying the drill type and corresponding emergency and/or emergency sub-type. Configuring drills may also include specifying the frequency at which each particular drill is to be performed, timeframes to which each drill is to be performed, automatic and configurable notifications to individuals when their drill deadline is approaching, notifications when the drill deadline has passed and the drill has not been performed, and/or notifications when the after drill report has not been uploaded to the system. The Drill Management feature may be fully integrated to the mobile application and any data that is captured during the incident drill may be recorded, captured, and integrated into the Drill Management feature portal. The Drill Management feature may also provide administrators and district personnel dashboards and reports that provide district wide visibility into their schools and a status on whether they are meeting their requirements. The Drill Management feature may also provide the export of reports that can be automatically delivered to state and federal agencies, e.g., in instances where such agencies require drill reporting and after incident reports.

Some aspects of the invention feature one or more non-transitory computer-readable storage media coupled to one or more processors and having instructions stored thereon which, when executed by the one or more processors, cause the one or more processors to perform operations in accordance with the methods provided herein.

Other aspects of the invention feature systems configured to implement the methods provided herein. The system can include one or more processors, and a computer-readable storage medium coupled to the one or more processors having instructions stored thereon which, when executed by the one or more processors, cause the one or more processors to perform operations in accordance with implementations of the methods.

Implementations of the present disclosure provide various technical advantages and/or improvements compared to traditional systems. For example, implementations enable the various (e.g., portable) computing devices included in the system to provide real time updates to student records or other information stored in a data store, to update the location and/or status of one or more students being managed during an emergency or drill scenario. The computing devices may also access the current, up-to-date information regarding the location and/or status of the students. By providing up-to-date information for access by the (e.g., portable) computing devices used by personnel during an emergency or drill scenario, implementations enable for more accurate and timely decision-making during an emergency, through the ready access to accurate, up-to-date information regarding students. Moreover, traditional systems may update information in batches to data stores over a network, and/or may rely on manual data entry to update the data stores. Accordingly, traditional systems may consume more network bandwidth compared to the implementations described herein, as operators of the traditional systems are required to make more network calls in an attempt to gain access to accurate status information. By providing more accurate and timely information regarding student location and status, implementations provide for more efficient use of processing capacity, storage space, active memory, network capacity, and/or other computing resources compared to traditional systems which may consume resources recovering from errors caused by less accurate and/or out-of-date information.

It will also be appreciated that various aspects of the invention can include any one or more features described herein, and that advantageous examples are envisioned which combine various combinations of features and functions optimal for a given application.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
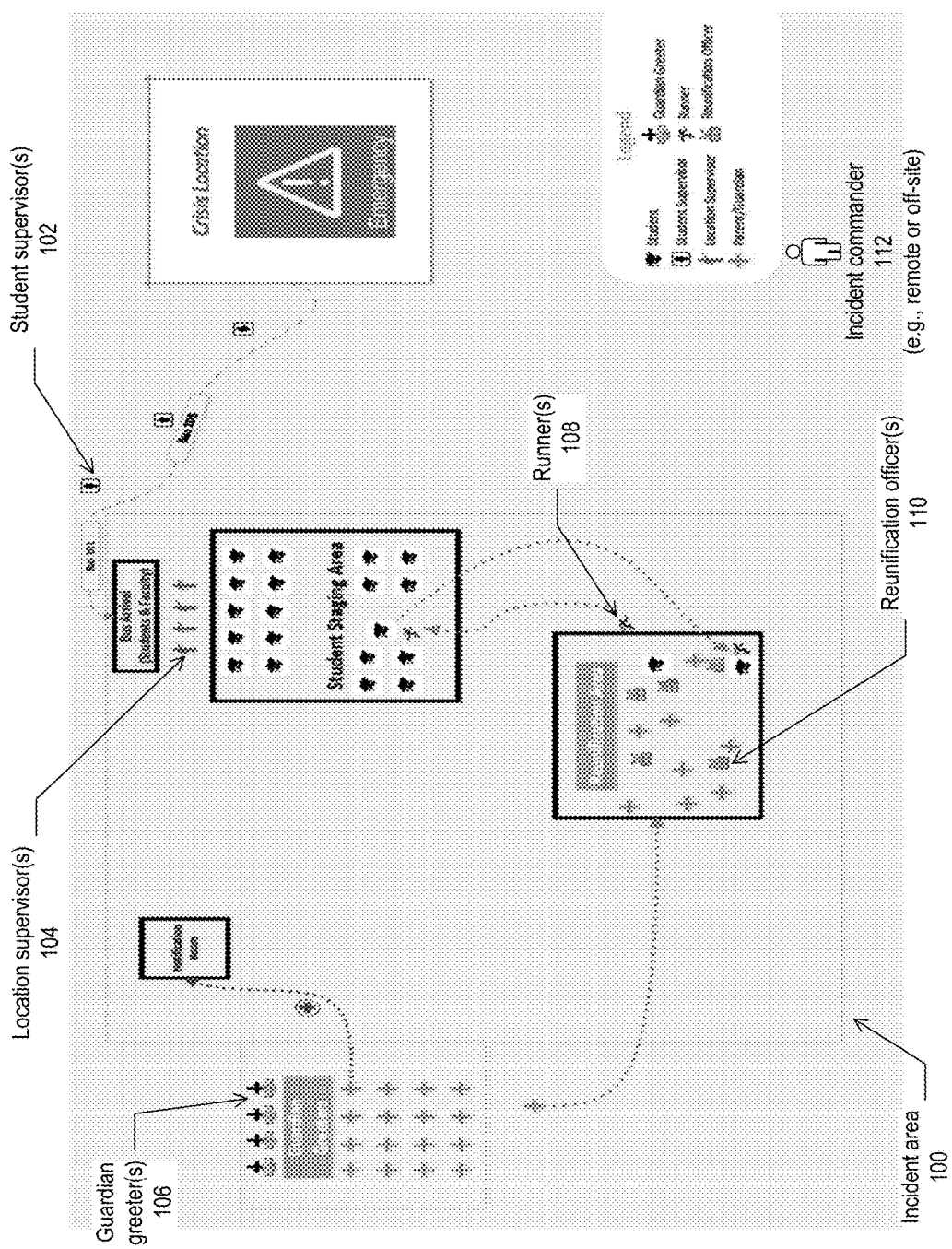
FIG. 1 depicts an example environment, such as an emergency incident area, in which implementations of the present disclosure may be employed.

The present disclosure describes implementations of systems, devices, methods, and computer-readable media for facilitating the reunification of students with guardians (e.g., parents) or other individuals in an emergency environment. Some implementations provide a mobile application that may execute on portable computing devices to enable faculty, teachers, school assistants, emergency responders, or others to keep track of the status and location of students or other individuals being assisted during an emergency situation and when performing drills. In some implementations, one or more server computing devices may have access to incident data stored on one or more data stores. Such incident data may include information regarding students and guardians (e.g., parents) of the students as well as information regarding visitors, volunteers, contractors, and/or other persons, where such information may be provided from a visitor management system. The incident data may also include current information describing the status or location of students. Various personnel may employ the mobile application to access and update the incident data, via communications between the mobile application and the server computing device(s). In some implementations, the mobile application may provide a different user interface (UI) based on the role of an authenticated user of the application. For example, the application may provide different UIs for use by student supervisors (e.g., teachers), location supervisors, guardian greeters, runners, and reunification officers. The different roles may be assigned different responsibilities during an emergency response, and the different UIs of the application may facilitate the performance of the different responsibilities as described herein. In some implementations, the application may also provide an incident commander UI that provides an up-to-date overview of the situation and the progress of response efforts to safeguard students or others.

By providing a paperless means of obtaining current information regarding student location, student status, or other incident data, implementations provide a more accurate and more up-to-date source of information during an emergency incident than may be available using traditional paper-based methods. Moreover, by providing different UIs for the various roles of personnel, implementations may provide for an organized emergency response in which roles and responsibilities are clear to the personnel involved, and in which the location and status of the students is tracked in real time as the students are moved to safety. Implementations provide tools for emergency drill tracking, accountability for students, faculty, visitors, volunteers, contractors, emergency response personnel, or others. Implementations also provide dashboard(s) (e.g., UI(s)) for real-time information and recovery reporting.

As used herein, an emergency may describe a human caused emergency, such as the occurrence or threat of a shooting, bombing, or other violence. An emergency may also be a naturally caused emergency, such as an earthquake, tsunami, volcanic activity, disease outbreak, or inclement weather event. Implementations may also be employed in response to other types of emergencies, emergency drills, or in other situations, without limitation.

As used herein, a student may describe any individual who is assisted during an emergency. Although examples herein may describe the use of implementations in a response to an emergency at a school, it will be understood that implementations may also be employed in other settings including but not limited to hospitals, elder care facilities, indigent care facilities, shelters, group homes, offices, residences, hotels, resort facilities, airports, train stations, planes, trains, ships, and so forth. Accordingly, a student may describe a patient, resident, or occupant of such settings who may need assistance during an emergency. A student may also include a non-human entity such as an animal. For example, implementations may be employed to keep track of animals at a zoo, wildlife preserve, farm, ranch, or other facility undergoing an emergency.

As used herein, a guardian may describe any individual who is at least in part responsible, legally or otherwise, for a student. A guardian may include a parent, grandparent, sibling, aunt, uncle, or other family member. A guardian may also include any person who, although not biologically related to the student, may have some responsibility for the care of the student. Accordingly, a guardian may include a stepparent, stepsibling, in-law, family friend, trusted neighbor, and so forth. A guardian may be a legal (e.g., court-appointed) guardian of the student, or a guardian may be responsible in a way that is not formalized by law. A guardian may have been designated, prior to the emergency, as a person responsible for one or more particular students. Such designation may be verified within the system. A guardian that has not been verified for pick-up may be considered an emergency contact that can be contacted in the instance where there is an emergency or drill that requires such assistance.

As used herein, a screen may describe a user interface or a portion of a user interface, such as one or more windows, frames, or other collection of presented elements.

As used herein, a gesture may describe any input made by a user to a user interface or to a portion of a user interface. A gesture may include inputs made to a touch-sensing display or other component of a device using a finger or other body part. A gesture may include a tap, double-tap tap-and-hold, swipe, pinch, rotate, pan, or any combination of these or other inputs. A gesture may also include inputs made using an input actuator such as a pen or rod. A gesture may also include inputs made to a user interface using an input device including, but not limited to, a mouse, a keyboard, a joystick, a touchpad, and so forth. Gestures may also include audio inputs such as voice commands, or haptic inputs such as a shaking or other movement of all or part of a computing device.

FIG. 1 depicts an example environment, such as an emergency incident area 100, in which implementations of the present disclosure may be employed. Although FIG. 1 depicts an example environment in which implementations may be used, implementations may also be used in other types of environments without limitation. In the example of FIG. 1, an emergency is in progress at a crisis location at a school, but implementations may be employed in other settings such as a hospital, elder care facility, or other types of sites. As shown in FIG. 1, students being assisted may be escorted from the crisis location to a student holding area, where the students may be initially held pending their reunification with guardians. In the example of FIG. 1, the student holding area is a gym that is physically separate from the crisis location. The student holding area may also include any other structure, enclosure, or non-enclosed area. The students may be transported from the crisis location to the student holding area in vehicles (e.g., buses) or on foot.

The students may be escorted to the student holding area by one or more student supervisors 102. In some cases, a student supervisor 102 may be a teacher, coach, teaching assistant, guidance counselor, or other member of the faculty of the school. A student supervisor 102 may be responsible for escorting a particular, predetermined set of students (e.g., a class, a grade, and so forth), or may be generally responsible for escorting students. The student supervisor 102 may access an application executing on a portable computing device, and such an application may provide a student supervisor UI. The student supervisor UI may enable the student supervisor 102 to access relevant information regarding the students, and may enable the student supervisor 102 to update the location, status (e.g., transportation status, health status, attendance status, hazardous status, or accounted for status), or other information regarding the students as described below. In some cases, one or both of the available student statuses or the available locations are customizable by a user.

One or more location supervisors 104 may be present at the student holding area. A location supervisor 104 may access an application executing on a portable computing device, and such an application may provide a location supervisor UI. The location supervisor UI may enable the location supervisor 104 to check students in to a location (e.g., the student holding area) by specifying the current location of the location supervisor or detected by the location supervisor's device 104 as the current location of the checked in student. The location supervisor UI may enable the location supervisor 104 to check students in to the current location, or to a location that is selected by the location supervisor or detected by the location supervisor's device 104 in the location supervisor UI. In some cases, the location supervisor UI may enable the location supervisor 104 to verify the identity of a student by scanning a student credential (e.g., identification card), by searching through a list of students, or through other methods.

Guardians may arrive on the scene and assemble in a guardian holding area. The guardian area may be an indoor or outdoor area. A guardian may be met at the guardian holding area by a guardian greeter 106. The guardian greeter 106 may access an application executing on a portable computing device, and such an application may provide a guardian greeter UI. The guardian greeter UI may enable the guardian greeter 106 to verify the identity of a guardian by scanning a credential of the guardian, such as a driver's license, passport, or other means of identification. The guardian greeter UI may also enable the guardian greeter 106 to access guardian information, to verify the guardian's identity and to ensure that the guardian is authorized and approved to be reunified with one or more students. After verifying the guardian's identity and authorization, the guardian greeter 106 may employ the guardian greeter UI to generate a reunification request to reunify the approved guardian with one or more students who are associated with the guardian. The reunification request may be added to a reunification queue for subsequent processing. The guardian greeter 106 may also employ the guardian greeter UI to add the one or more students to a runner queue, indicating that the student(s) are to be escorted from the student holding area to a reunification area where they may be reunified with the guardian.

One or more runners 108 may have the responsibility to escort student(s) from the student holding area to the reunification area. A runner 108 may access an application executing on a portable computing device, and such an application may provide a runner UI. The runner UI may enable the runner 108 to access the runner queue and select a record specifying one or more students to be escorted to the reunification area. The runner UI may also enable the runner 108 to update the escort status of a student from a first status to a second status to a third status. The runner queue, as presented in the runner UI, may employ different icons or other status indicators to indicate the status of a student in the runner queue. A first status may indicate that the student is awaiting escort and no runner 108 has been assigned to escort the student. A second status may indicate that a runner 108 has been assigned to escort the student, and the student is awaiting escort. A third status may indicate that the student is in transit, and that a runner 108 is currently escorting the student to the reunification area. Implementations also support more, fewer, or different statuses. On arriving at the reunification area with the student, the runner 108 may employ the runner UI to indicate that the student has arrived. On arrival at the reunification area, the student may be removed from the runner queue and the status of the corresponding reunification request in the reunification queue may be changed to indicate that the reunification officer 110 has taken responsibility of the student from the runner 108, and that the student is in the reunification area.

One or more reunification officers 110 may be present at the reunification area to supervise the reunification of guardians with students. The reunification area may be an indoor or an outdoor area. A reunification officer 110 may access an application executing on a portable computing device, and such an application may provide a reunification officer UI. The reunification officer UI may enable the reunification officer 110 to access the reunification queue. The reunification officer 110 may select, from the reunification queue, a reunification request that indicates the reunification area as the current location of the student. The guardian of the student may then proceed from the guardian holding area to the reunification area, in some cases escorted by a faculty assistant. The reunification officer 110 may verify the identities of the guardian and the student(s) to be reunified, and may employ the reunification officer UI to change the status of the reunification request to reunified. In some implementations, the reunification officer UI may include a control to receive the guardian's signature or other indication that the guardian has been reunified with the student(s). Although examples herein describe a guardian holding area that is separate from the reunification area, in some cases the guardian holding area may also function as the reunification area. Moreover, in some cases the student holding area (e.g., staging area) may also function as the reunification area. Accordingly, implementations may include fewer steps of moving the students from area to area, and moving the guardians from area to area, than are described in the examples herein.

In some implementations, the reunification officer UI may include features that enable the reunification officer 110 to accept and assume responsibility for the student when the student arrives at the reunification area with the runner 108. In such cases, the runner UI does not enable the runner 108 to update the status of the reunification request, and instead the reunification officer UI includes functionality to enable the reunification officer 110 to change the status of the reunification request to indicate that the student has arrived. In this way, implementations document the handoff of the student from the runner 108 to the reunification officer 110, or other handoffs between personnel.

In some implementations, the runner UI may include features that enable runners to execute the responsibility to perform the guardian reunification process. In this way, the runner UI enables the user to assume the role of a reunification officer, thus performing the guardian verification, reunification, signature capturing, and final reunification verification. For example, a runner may escort a student to a reunification area where the student is reunified with a guardian. The runner UI may present guardian identification information (e.g., name, image, authorization to pick-up, etc.) similar to that described as presented in the reunification officer UI, and the runner may use such information to verify the guardian's identity and/or authorization to pick-up the student. In such instances, the reunification officer may be omitted from the personnel managing the incident response, and/or the reunification officer may be assigned other responsibilities.

In some cases, an incident commander 112 may be responsible for overseeing at least a portion of the emergency response. The incident commander 112 may employ a computing device to access an incident commander UI of the application. The incident commander UI may present incident information such as the current number, or proportion, of students who are accounted for, not accounted for, injured, missing, reunified with guardians, released, and so forth. The incident commander UI may also present incident information indicating the current number, or proportion, of students who are at various locations, the number or proportions of students not reunified and/or in the reunification queue, the number or proportion of students in the runner queue, or other information. In some implementations, the incident commander UI may enable the incident commander 112 to send messages, such as push notifications, IP-based messages, over-the-top messages, text messages, in-app messaging or another communication means to one or more recipients. Such messages may be pre-written to enable the incident commander 112 to readily update recipients on the status of the emergency response. The incident commander 112 may also provide features to add or remove additional locations to be monitored, view lists of personnel, view student information, view guardian information, initiate an emergency response, or initiate a drill or test of the emergency response system.

Figure 2:
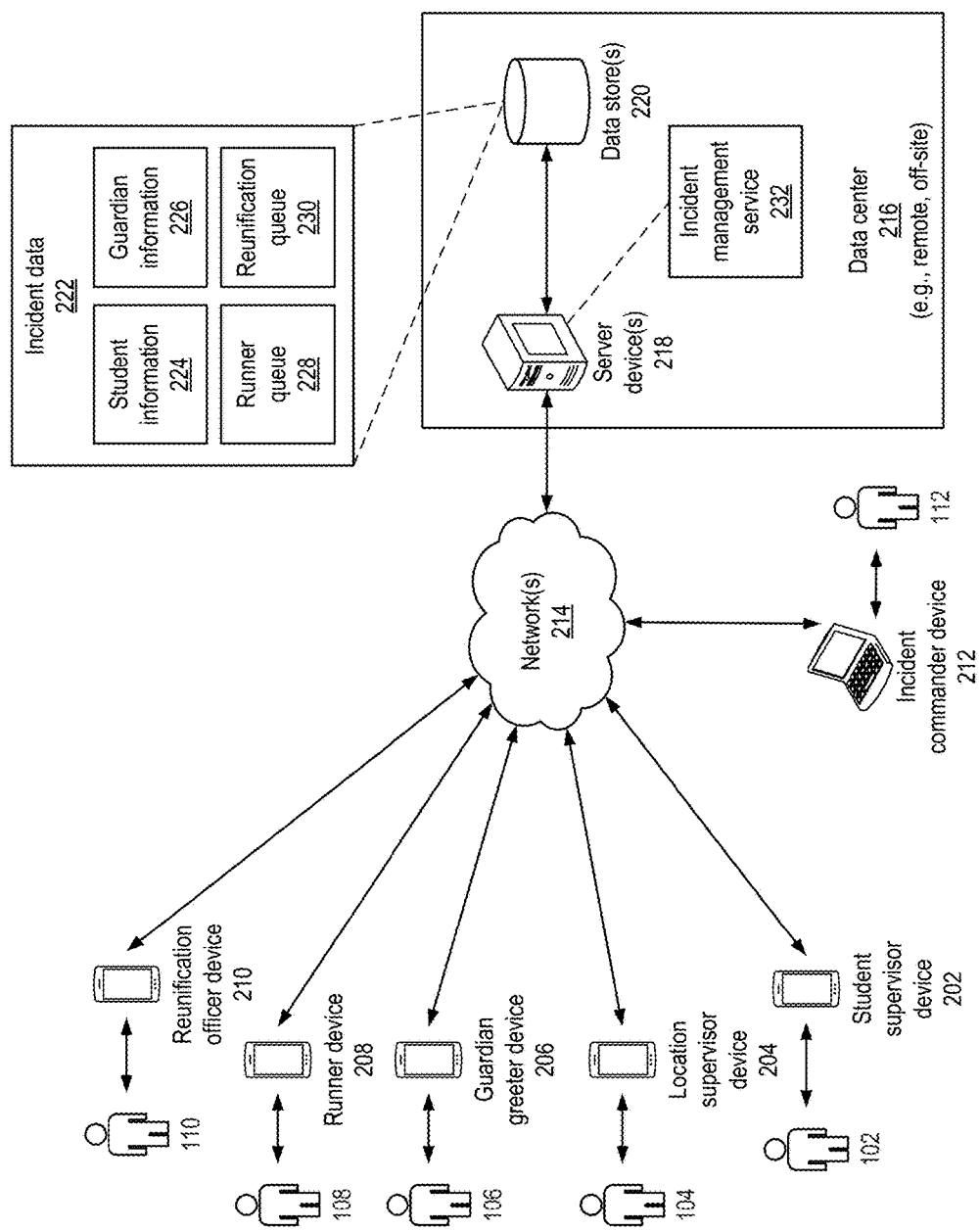
FIG. 2 depicts an example system of multiple computing devices in accordance with implementations of the present disclosure.

FIG. 2 depicts an example system of multiple computing devices in accordance with implementations of the present disclosure. As shown in the example of FIG. 2, the system may include student supervisor device(s) 202 operated by a student supervisor(s) 102, location supervisor device(s) 204 operated by location supervisor(s) 104, guardian greeter device(s) 206 operated by guardian greeter(s) 106, runner device(s) 208 operated by runner(s) 108, and reunification officer device(s) 210 operated by reunification officer(s) 110. In some cases, one or more of these devices may be a portable computing device such as a tablet computer, smartphone, wearable computer, notebook computer, personal data assistant (PDA), implanted computer, and so forth. The use of portable computing devices may enable the users to access current information regarding the emergency response while moving about the site. In some cases, one or more of these devices may be a less portable computing device such as a laptop computer, desktop computer, and so forth. The system may also include incident commander device(s) 212 operated by incident commander(s) 112. The incident commander device(s) 212 may include portable computing device(s) or less portable computing device(s). In some cases, the incident commander(s) 112 may be located in a command center that is separate from one or more of the incident, emergency, or drill locations, evacuation routes, student holding area, the guardian holding area, or the reunification area.

The various devices 202, 204, 206, 208, 210, and 212 may communicate via one or more networks 214. The network(s) 214 may include public networks such as the internet, private networks such as an institutional or personal intranet, or any combination of private and public networks. The network(s) 214 may include any type of wired or wireless network, including but not limited to local area networks (LANs), wide area networks (WANs), wireless WANs (WWANs), or wireless LANs (WLANs). The network(s) 214 may also include mobile communications networks including, but not limited to, a 3G network, a 4G network, an Edge network, a Long Term Evolution (LTE) network, and so forth. In some implementations, the communications between computing devices over the network(s) 214 may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol. In some cases, the network(s) 214 may include a WLAN that provides network accessibility in or near the incident area in which the emergency response is taking place. Such a WLAN may have been set up specifically to handle communications during the emergency response.

The devices 202, 204, 206, 208, 210, and 212 may employ the network(s) 214 to communicate with a data center 216 that includes one or more server devices 218 and one or more data stores 220. In some cases, the data center 216 may be remote or off-site with respect to the incident area. The server device(s) 218 may include any number and any type of computing devices, such as server computers, network computers, mainframe computers, distributed computing devices (e.g., cloud servers), and so forth. The server device(s) 218 may execute any number of software modules (not shown), such as processes, applications, libraries, interfaces, and so forth, to provide an incident management service 232. The data store(s) 220 may include any number and any type of data storage devices, storage nodes, databases, and so forth. The data store(s) 220 may be component(s) of the server device(s) 218, or may be external to the server device(s) 218. The data store(s) 220 may employ any type of data storage format, and may include relational databases or non-relational data stores. In some cases, at least a portion of the data stored in the data store(s) 220 may be received from other management services, such as a visitor management service that tracks the identify, location, status, or other information regarding visitors (e.g., guardians, vendors, contractors, emergency responders, media, volunteers, etc.) currently present at the incident area 100.

The data store(s) 220 may store incident data 222 including, but not limited to, one or more of student information 224, guardian information 226, runner queue(s) 228, or reunification queue(s) 230. The student information 224 may include any number of student records, each storing information regarding a student. A student record may include one or more of the following: the student's identification number, the student's name, a description of the student's appearance, an image of the student, the student's age, the student's grade, the student's teacher, medical information including known allergies, medications, medical treatments, medical conditions, other medical notes, special needs, and the authorized and approved for pick-up guardian(s) of the student, emergency contacts, or other information. The student record may also include information that may be updated during an emergency response situation, such as the current status of the student (e.g., injured, healthy, reunified, not reunified, released, not released, missing, accounted for, and so forth), the current location of the student, the current status of the student, and so forth.

The guardian information 226 may include any number of guardian records, each storing information regarding a guardian. A guardian record may include one or more of the following: the guardian's identification number (e.g., driver's license number, social security number, and so forth), the guardian's name, a description of the guardian's appearance, the age of the guardian, an image of the guardian, the student(s) associated with the guardian, confirmation of approval for pick-up, or other information. The guardian record may also include information that may be updated during an emergency response situation, such as the current location of the guardian (e.g., guardian holding area, reunification area, and so forth) and whether the guardian has been reunified with one or more students.

The runner queue 228 may be a queue, list, table, or other data structure having multiple records or nodes that each describes one or more students to be escorted to a destination area such as the reunification area. The reunification queue 230 may be a queue, list, table, or other data structure having multiple records or nodes that each describes a reunification request to reunify one or more students with an associated guardian.

The various devices 202, 204, 206, 208, 210, and 212 may communicate, over the network(s) 214, with the incident management service 232 running on the server device(s) 218. The devices 202, 204, 206, 208, 210, and 212 may provide data to be employed by the server device(s) 218 to update the incident data 222. The devices 202, 204, 206, 208, 210, and 212 may also receive, process, and present data that the server device(s) 218 have retrieved from the data store(s) 220.

Figure 3:
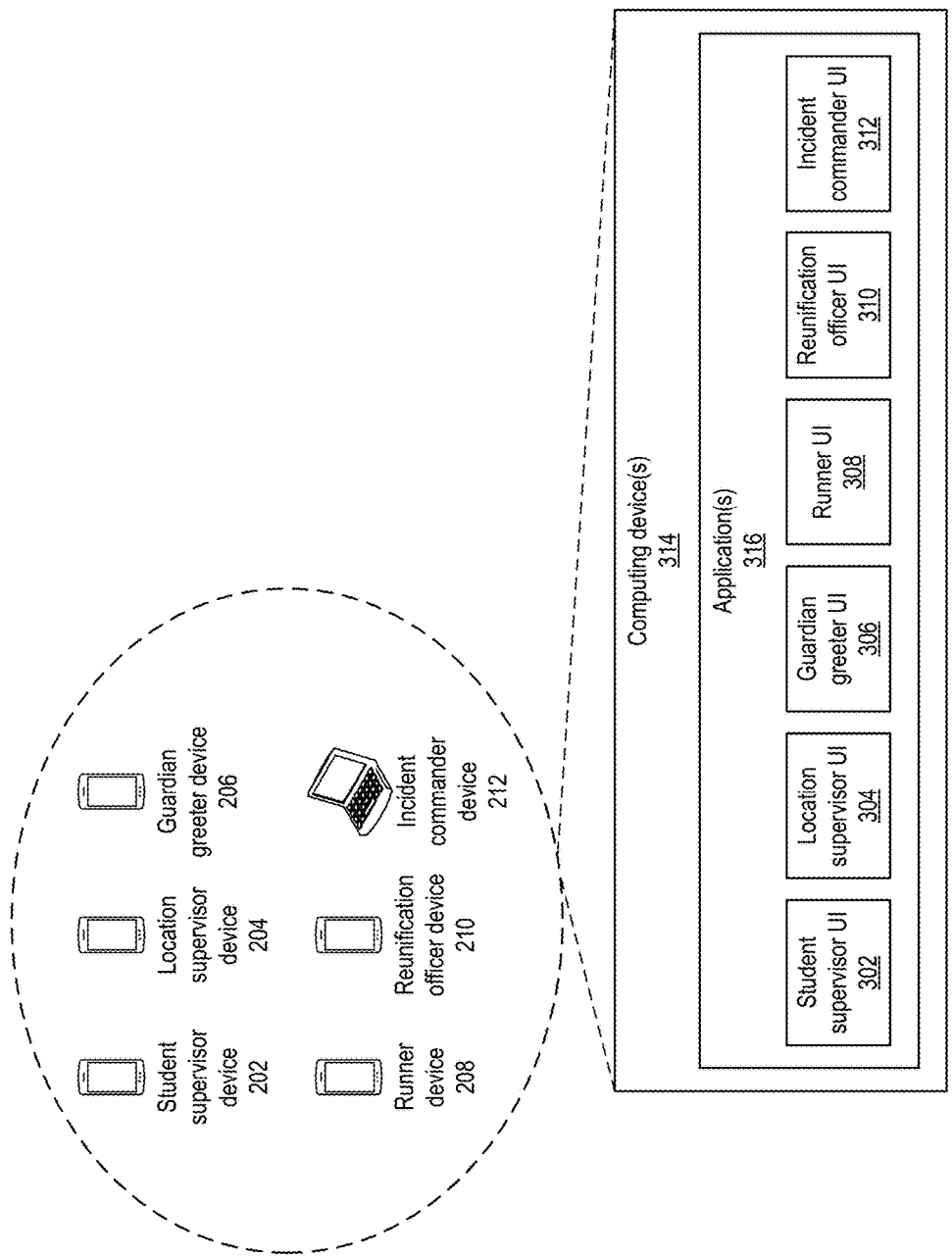
FIG. 3 depicts an example system of one or more computing devices in accordance with implementations of the present disclosure.

FIG. 3 depicts an example system of one or more computing devices 314 in accordance with implementations of the present disclosure. The computing device(s) 314 may include one or more of the student supervisor device 202, location supervisor device 204, guardian greeter device 206, runner device 208, reunification officer device 210, or incident commander device 212. Although various examples herein may describe the devices 202, 204, 206, 208, and 210 as portable computing devices (e.g., smartphones, tablets, etc.) and the device(s) 212 as less portable computing device(s) (e.g., laptop computers, desktop computers, etc.), any of the computing device(s) 314 may include portable or less portable computing devices. The computing device(s) 314 are described further with reference to FIG. 19.

The computing device(s) 314 may execute one or more applications 316. The application(s) 316 may be written or otherwise described using any programming language. In some cases, the application(s) 316 may include one or more native applications that are compiled, linked, or otherwise built from source code to generate machine-executable binary instructions configured to execute on the processor(s) and within the operating system (OS) of a computing device(s) 314. In some cases, the application(s) 316 may be written in a programming language that compiles to an intermediate language (e.g., bytecodes) that is executable within a runtime application such as a Java™ Virtual Machine (JVM), C#™ runtime, or any other runtime, interpreter, virtual machine, or execution engine running on the computing device(s) 314. In some cases, the application(s) 316 may include any number of executable instructions in a scripting language or interpreted language, such as JavaScript™, ActiveScript™, VBScript™, Perl™, shell scripting languages, and so forth. In such cases, the application(s) 316 may execute within a runtime, interpreter, virtual machine, scripting engine, or other execution container.

In some cases, the application(s) 316 may be configured to execute, at least partly, in a web browser or other container for the presentation of web content, such as a WebView or UIWebView class. The application(s) 316 may include dynamic scripting or programmatic elements described using any programming language, such as JavaScript™, ActiveScript™ VBScript™, Perl™, and so forth. Implementations support the use of any appropriate web browser to execute the application(s) 316 on the computing device(s) 314. Such a web browser may include, but is not limited to, one or more of the following: Mozilla Firefox™; Microsoft Internet Explorer™; Google Chrome™; Apple Safari™; Rockmelt™; and so forth. In cases where the application(s) 316 are configured to be presented, at least partly, within a web browser or other container for the presentation of web content, the application(s) 316 may include any number of web pages that are described at least in part using a markup language such as any version of Hypertext Markup Language (HTML), Dynamic HTML (DHTML), Extensible HTML (XHTML), Extensible Markup Language (XML), and so forth.

The application(s) 316 may expose or otherwise provide one or more UIs that enable users to interact with the application(s) 316. The UIs may include graphical UIs, command line UIs, or other types of UIs. The UIs may include one or more of a student supervisor UI 302, a location supervisor UI 304, a guardian greeter UI 306, a runner UI 308, a reunification officer UI 310, an incident commander UI 312, or other UI(s). The features and operations of these UIs are described further with reference to FIGS. 4-18.

In some implementations, a same application 316 or set of applications 316 may be configured to present any or all of the UIs described herein based on a role of a user who is logged into the application(s) 316. For example, an application 316 may present the student supervisor UI 302 to a user who is a student supervisor 102, the location supervisor UI 304 to a user who is a location supervisor 104, and so forth. In some implementations, different applications 316 provide different versions of the UIs. For example, a first application 316 may present the student supervisor UI 302 and a second, different application 316 (e.g., a separate executable process) may present the location supervisor UI 304, and so forth. In some implementations, a computing device 314 may be used by a user in any role. For example, a computing device 314 may be described as a student supervisor device 202 if the current user is a student supervisor 102, as a location supervisor device 204 if the current user is a location supervisor 104, and so forth. In some cases, a computing device 314 may be particularly configured (e.g., through its hardware or software configuration) to operate as one of the devices 202, 204, 206, 208, 210, or 212.

Figure 4:
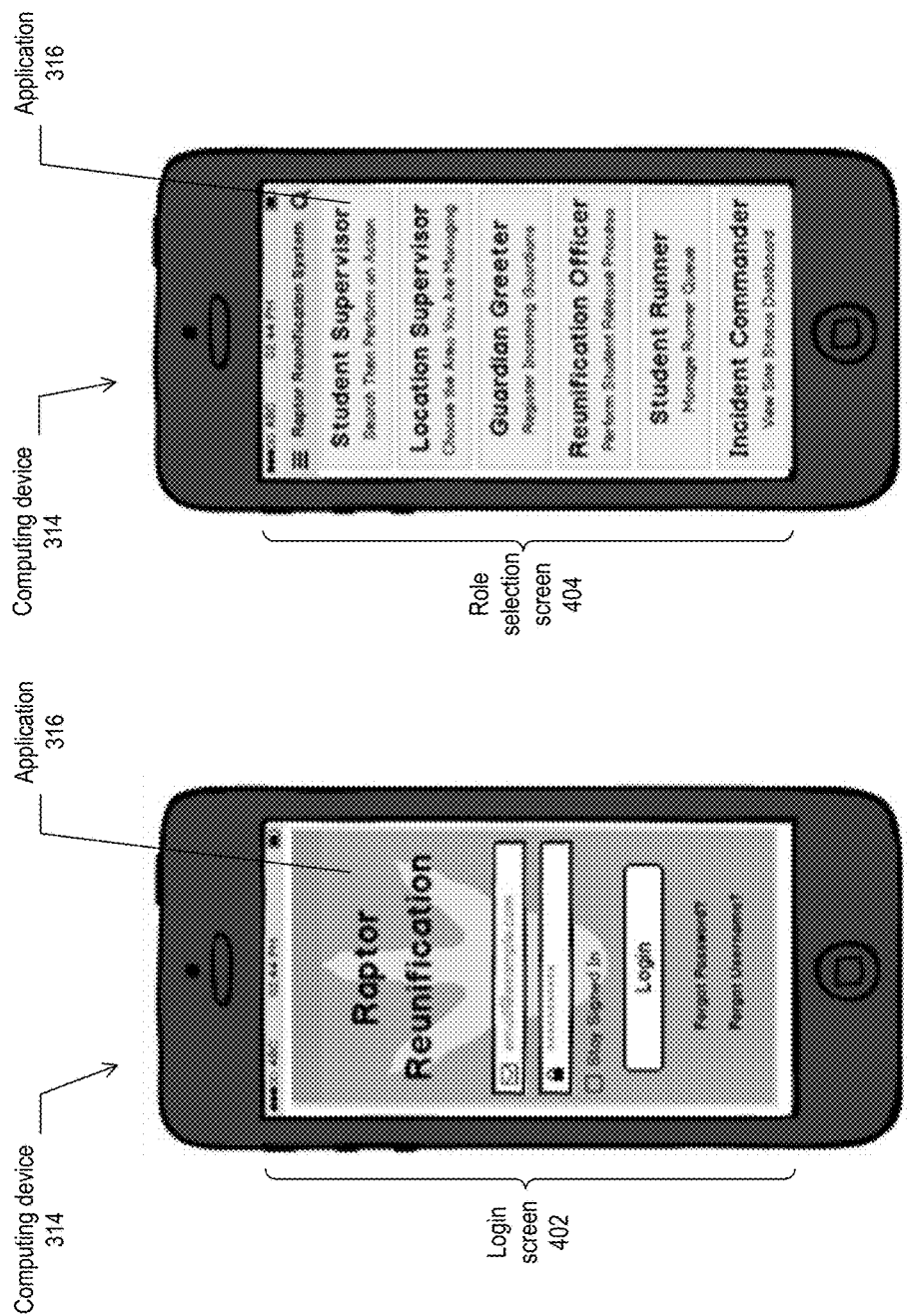
FIG. 4 depicts an example computing device executing an application in accordance with implementations of the present disclosure.

FIG. 4 depicts an example computing device 314 executing an application 316 in accordance with implementations of the present disclosure. In the example of FIG. 4, a user has launched the application 316 on a computing device 314. The application 316 may present a login screen 402 to enable the user to log into the incident management service 232. The user may enter credentials, such as a username, email address, user identifier, login, password, passcode, and so forth. The user may also utilize biometric information, such as fingerprint verification, facial recognition, and/or other techniques to identify the individual. If the user credentials are authenticated, the user may be provided with further access to the application 316.

Figure 5:
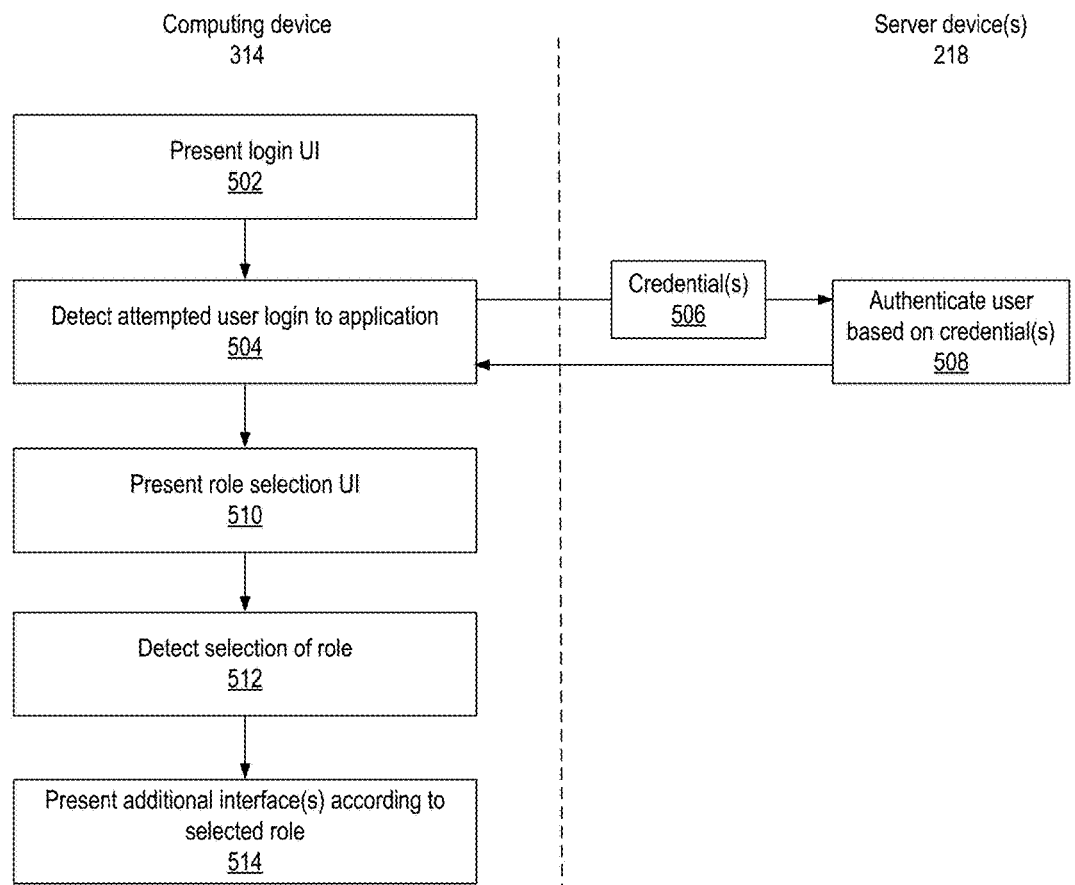
FIG. 5 depicts an example process that may be executed to interact with an application in accordance with implementations of the present disclosure.

FIG. 5 depicts an example process that may be executed in accordance with implementations of the present disclosure. Operations of the process may be performed by the one or more of the application(s) 316, the incident management service 232, or other software executing on the computing device(s) 314, the server device(s) 218, or elsewhere.

The application 316 may launch and present (502) the login screen 402. The application 316 may detect (504) an attempted user login to the application 316 based on credential(s) 506 entered through the login screen 402. The credential(s) 506 may be communicated to the incident management service 232 which may authenticate (508) the user based on the credential(s) 506. If it is determined that the credential(s) 506 correspond to credential(s) previously provided by a user, the incident management service 232 may determine that the user is authorized to further access the application 316. In such cases, a communication may be sent to the application 316 to notify the user of a successful login. If the credential(s) 506 do not correspond to those of a user, a communication may be sent to the application 316 to indicate a failed login attempt.

If login is successful, the application 316 may detect (512) the selection of a role via the role selection screen 404. The application 316 may present (514) one or more additional interfaces based on the role of the user, as described further below.

In some implementations, as in the example of FIGS. 4 and 5, the user may select their role in the role selection screen 404. In some implementations, the incident management service 232 may determine the role for the user based on the user's identity as indicated by the credential(s) 506. In such cases, the application 316 may not present the role selection screen 404, and the application 316 may present a role-specific UI after a successful login. In some cases, a particular user may be authorized to perform a plurality of roles. In such cases, the role selection screen 404 may enable the user to select from those roles for which the user is authorized. In some implementations, the UI may default to a primary role for the user, determined based on the user's credential(s) 506, and the UI may present the role selection screen to enable the user to switch from a primary role to a secondary role, if the user is authorized to act in other role(s).

Figure 6C:
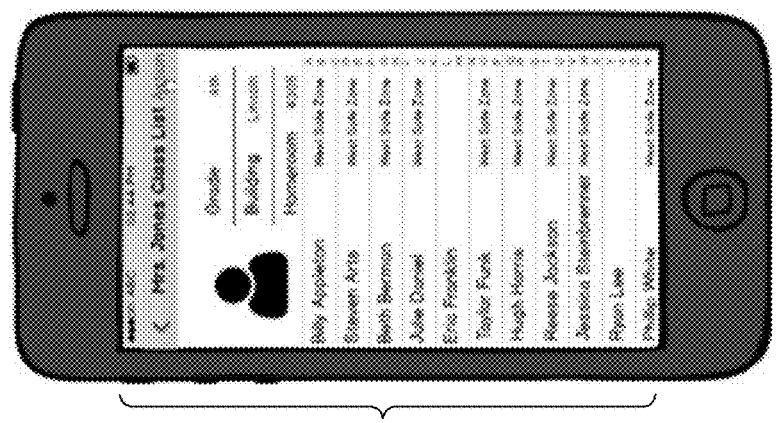
FIGS. 6A-C depict an example computing device executing an application that provides a student supervisor user interface, in accordance with implementations of the present disclosure.
Figure 6B:
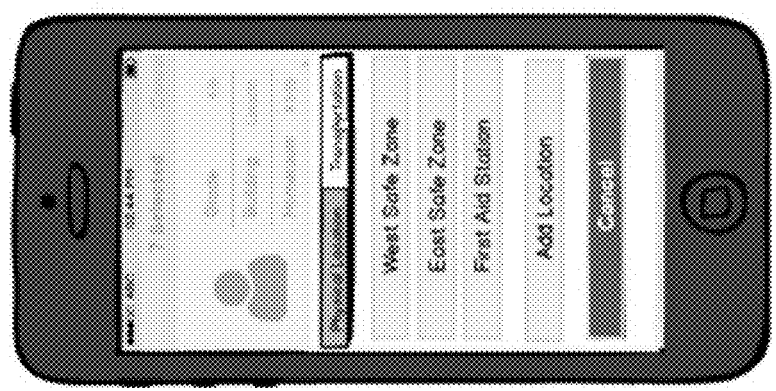
Figure 6A:
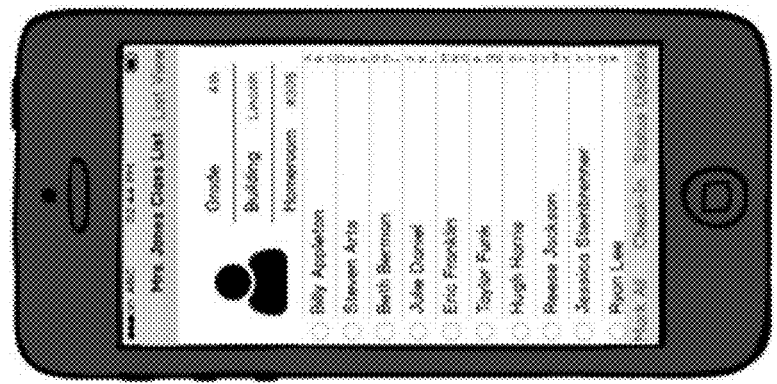

FIGS. 6A-C depict an example computing device 314 executing the application 316 to present various screens of the student supervisor UI 302, in accordance with implementations of the present disclosure. Using the screen 302a, a student supervisor 102 may view a roster of students such as students that are in the class taught by the student supervisor 102. Using the screen 302b, the student supervisor 102 may view a list of possible locations for students (e.g., west safe zone, east safe zone, first aid station, and so forth). The screen 302b may also enable the student supervisor 102 to specify additional locations. The screen 302c may enable the student supervisor 102 to select from a list of possible statuses for students, or add to additional statuses. The status of a student may include one or more of a transportation status, a health status, attendance status, last known whereabouts information details, or an accounted for status. Accounted for status may indicate whether the student is currently accounted for (e.g., location known and verified by on-site personnel) or unaccounted for (e.g., location unknown). Attendance status may indicate whether the student was at school that day or left early for any reason. Last known whereabouts status may indicate that a student is missing and provide contextual information regarding the last known whereabouts of the individual to facilitate the emergency response process. Health status may indicate whether the student is in normal health or whether the student is injured or health-impaired in some way. Transportation status may indicate that the student is in transit from the crisis area to the student holding area, from the student holding area to the reunification area, or otherwise in transit. Transportation status may also indicate a particular bus or other vehicle currently transporting the student. Using the screen 302c, the student supervisor 102 may specify a current location, safe zone, evacuation zone, lockdown room, or transportation status of one or more of the students in the roster, if current location(s) or transportation status(es) are known for the student(s). The student supervisor UI 302 may also present other information, such as a profile of the student supervisor 102 (e.g., teacher), grade, ID number, contact information, emergency contact details, building, or schedule and period information that corresponds to the available rosters of students associated with the student supervisor 102.

The student supervisor UI 302 may enable a student supervisor 102 to view a roster of students in their class. The student supervisor UI 302 may enable the user to view a roster according to various criteria, such as one or more schedules, blocks, semesters, terms, or periods that are used by the institution to schedule class sessions. The student supervisor 102 may also view a roster of students in a different class if the student supervisor 102 is assigned to supervise a class other than their own, if the student supervisor 102 is a substitute teacher, if the student supervisor 102 is an emergency responder (e.g., police officers, firefighters, emergency medical technicians, and so forth) or other outside personnel, or in other situations. The student supervisor 102 may take attendance of the class through the student supervisor UI 302, and check each student off into a location or transportation status. In some cases, the locations or transportation modes may have been previously defined by an incident commander 112 or by the administration of the site where the incident is occurring (e.g., school administration). The student supervisor UI 302 may enable a user to add additional locations or transportations modes. In some implementations, the student supervisor UI 302 may enable a user to view student information (e.g., student name, grade, teacher, image, location, status, authorized approved for pick-up guardians, emergency contacts, health information and so forth) by selecting a student listed in the roster.

Figure 7:
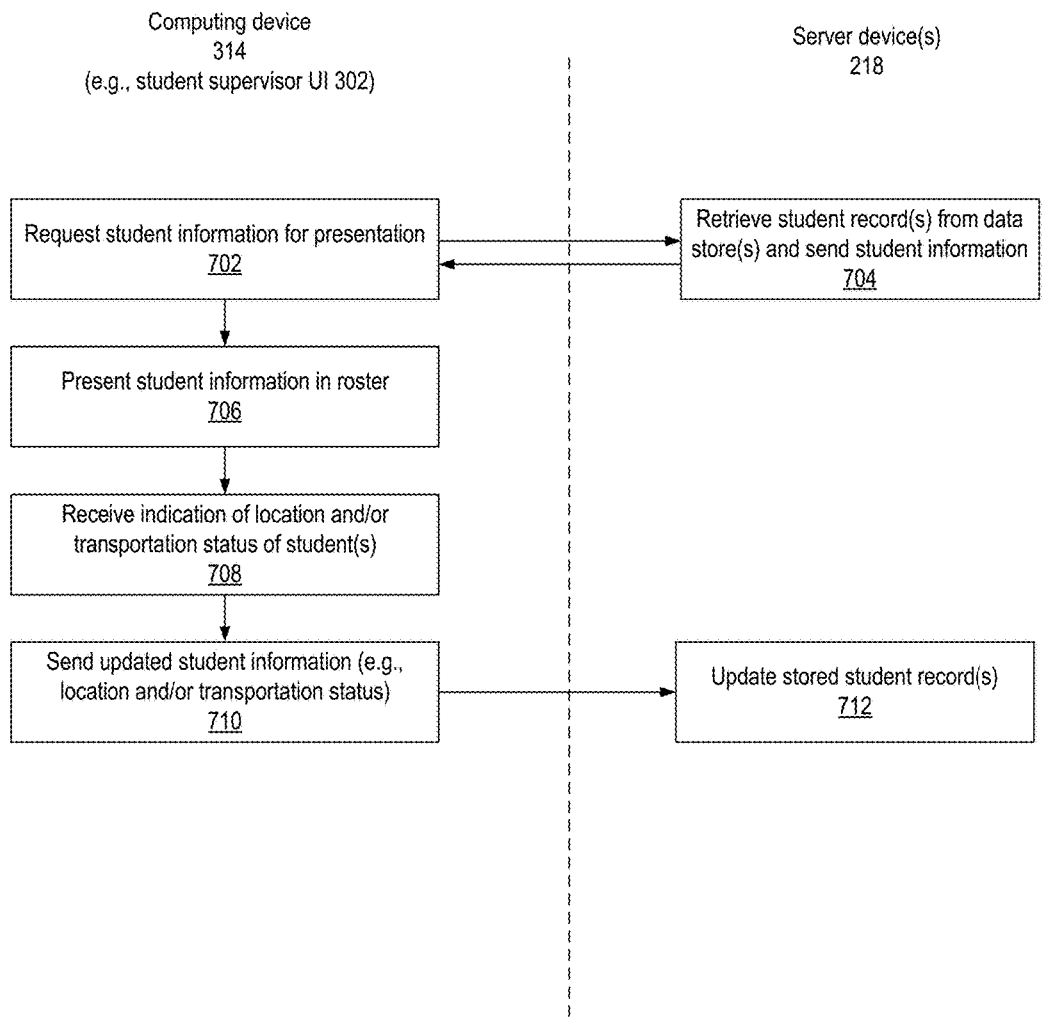
FIG. 7 depicts an example process that may be executed with regard to a student supervisor user interface, in accordance with implementations of the present disclosure.

FIG. 7 depicts an example process that may be executed regarding the student supervisor UI 302, in accordance with implementations of the present disclosure. Operations of the process may be performed by the one or more of the application(s) 316, the incident management service 232, or other software executing on the computing device(s) 314, the server device(s) 218, or elsewhere.

Based on a command or gesture entered through the application 316, the application 316 may request (702) student information for presentation in the student supervisor UI 302. For example, a student supervisor 102 may request to view a roster of students by selecting a combination of schedule, block, term, semester, or periods. The request may be communicated to the incident management service 232, which may retrieve (704) one or more student records from the data store(s) 220 based on the request. The incident management service 232 may send the student record(s) to the application 316, which may present (706) the received student information in a roster in the student supervisor UI 302.

Based on a command or gesture entered through the application 316, the application may receive (708) an indication of one or both of a location or transportation status of one or more students listed in the roster. For example, the student supervisor 102 may select a student by tapping on the roster and select a location for the student from a list of available locations as shown in FIG. 6B, or enter a location manually. The student supervisor 102 may similarly select a transportation status for the student from a list of available transportation statuses, or enter a transportation status manually.

The application 316 may send (710) the updated student information, such as location or transportation status for student(s), to the incident management service 232, which may update (712) the student records in the data store(s) 220. In some implementations, the application 316 enables the student supervisor 102 or other personnel to create and store notes that are incorporated into the student records.

FIGS. 8A-H depict an example computing device 314 executing the application 316 to present various screens of the location supervisor UI 304, in accordance with implementations of the present disclosure. The location supervisor UI 304 may present a screen 304a listing possible locations where the location supervisor 104 may be located, and the location supervisor 104 may select one of the locations as a current location. In some cases, the location may be determined through other methods. For example, a location of a device may be determined based on signals received from a satellite-based location service such as the Global Positioning System (GPS).

The location supervisor 104 may employ the location supervisor UI 304 to find a particular student, and check the student into the location. For example, a screen 304b may enable the user to select whether to search for a student based on the student's teacher (e.g., "search by teacher"), grade (e.g., "search by grade"), or name (e.g., quick find), or by scanning a student credential (e.g., scan a student identification card). The screen 304b may also include a control to enable a user to enter the name of a student, faculty member, visitor, volunteer, or vendor and manually to check them into the location.

Screen 304c, including a roster of students for a particular teacher, may be presented when the user selects to search by teacher. The user may then select particular student(s) from the roster, and the student information may be presented for that student. The user may then check the student(s) into the location. The UI may also present student information for a student in response to a gesture selecting or otherwise indicating the student in the roster.

Screen 304d may be presented when the user selects to scan a student credential. For example, students may each have an identification card or badge that may include a scannable barcode. The barcode may be arranged according to any format or standard. Although various figures may depict a one-dimensional barcode, implementations also support the use of multi-dimensional barcodes such as those arranged according to a version of the Quick Response (QR) code standard. The user may employ an image capture device of the computing device 314 (e.g., a camera) to capture an image of the student's identification card or badge, and software on the computing device 314 may analyze the barcode to decode information encoded by the barcode. The encoded information may include an identifier of the student, such as a name, identification number, or other information identifying the student. If the scan is successful, the location supervisor UI 304 may request student information based on the decoded student identifier, and present the screen 304e including student information such as name, grade, identification number, teacher, and an image of the student.

Screen 304f, including a roster of students for a particular grade, may be presented when the user selects to search by grade. The user may then select particular student(s) from the roster. The user may then check the student into the location.

In some implementations, the location supervisor UI 304 may present a screen 304g to enable a user to search for individuals by name or other search terms (e.g., "quick find"). For example, as shown in FIG. 8G, the user may enter query term(s) (e.g., "Johnson") and request a search based on the query term(s). The screen 304g may present a list of individuals corresponding to the search query. The user may then select a student from the list to check them into the location.

The screen 304h may enable a user to manually enter information regarding the individual to be checked into the location, such as the name (e.g., first name, last name, etc.), type (e.g., student, teacher, volunteer, etc.), and notes to indicate any other information.

Figure 9:
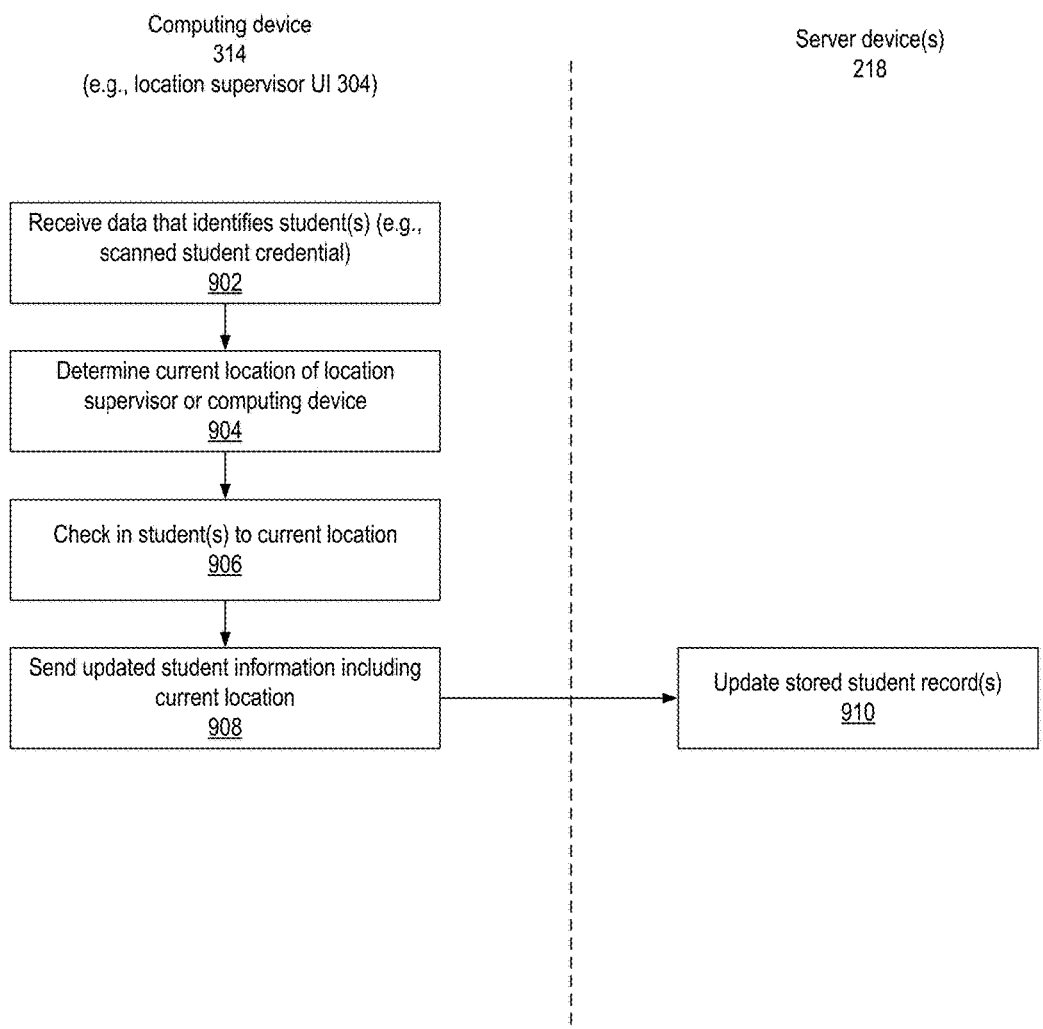
FIG. 9 depicts an example process that may be executed with regard to a location supervisor user interface, in accordance with implementations of the present disclosure.

FIG. 9 depicts an example process that may be executed regarding the location supervisor UI 304, in accordance with implementations of the present disclosure. Operations of the process may be performed by the one or more of the application(s) 316, the incident management service 232, or other software executing on the computing device(s) 314, the server device(s) 218, or elsewhere.

The application 316 may receive (902), through the location supervisor UI 304, data that identifies one or more students. As described above, the data may be received through a selection made in a roster of students for a particular teacher or grade, through a search based on at least a portion of the student name, or through the scan of a student credential. The data may also be manually entered by the location supervisor 104.

The current location may be determined (904), based on a selection of the location through the screen 304a as described above, or through other methods. The current location may be the current location of the computing device 314 presenting the location supervisor UI 304, the current location of the location supervisor 104, or both.

The identified student(s) may be checked in (906) to the current location, which may include sending (908) the updated student information (e.g., the current location of the student) to the incident management service 232. The incident management service 232 may update (910) the stored student record(s) in the data store(s) 220 to update the current location(s) of student(s).

FIGS. 10A-G depict an example computing device 314 executing the application 316 to present various screens of the guardian greeter UI 306, in accordance with implementations of the present disclosure. In some implementations, the guardian greeter UI 306 may present a screen 306a that enables a guardian greeter 106 to select a mode for verifying the identity and authorization of a guardian in the guardian holding area. For example, the screen 306a may enable the user to request a search, by name, for the guardian. The screen 306a may also enable the user to scan a guardian credential to identify the guardian.

A selection of the search mode may cause the guardian greeter UI 306 to present a search dialog (not shown) in which the user may enter a search query, such as a portion of the name of the guardian. The guardian greeter UI 306 may send the search query to the incident management service 232, which may return a list of results based on guardians currently listed in the incident data 222. The user may select the appropriate guardian from the list of results. Alternatively, the guardian greeter UI 306 may present a search dialog that enables the user to search a list of students based on at least a portion of a student name. The guardian greeter UI 306 may present a list of results based on students currently listed in the incident data 222. The user may select a particular student and view the guardian(s) who are associated with that student. The user may then select the particular guardian information from the list of guardian(s) associated with the student.

The guardian greeter UI 306 may present a screen 306c including guardian information such as the guardian's name, associated student(s), relationship to the student(s), date of birth, identification number (e.g., driver's license or passport number), image of the guardian, or other information. The guardian greeter UI 306 may also present a screen 306b that describes a student associated with the guardian and, in some cases, other guardians of the student. Based on the image of the guardian, the identification number, or other descriptive information, the guardian greeter 106 may verify that the guardian is who he or she claims to be, and verify that the guardian is authorized to take custody of the student.

Figure 10C:
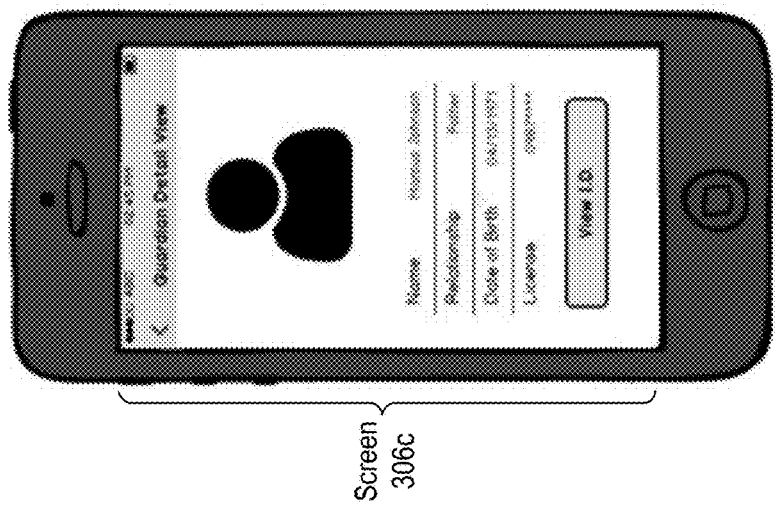
FIGS. 10A-G depict an example computing device executing an application that provides a guardian greeter user interface, in accordance with implementations of the present disclosure.
Figure 10B:
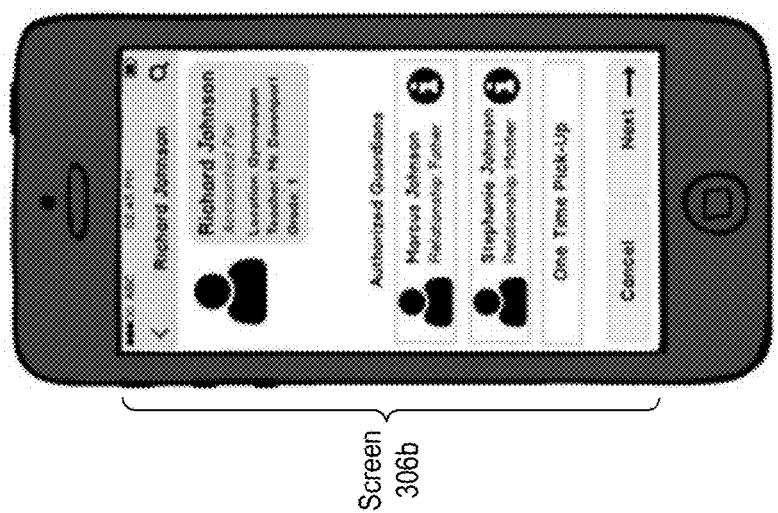
Figure 10A:
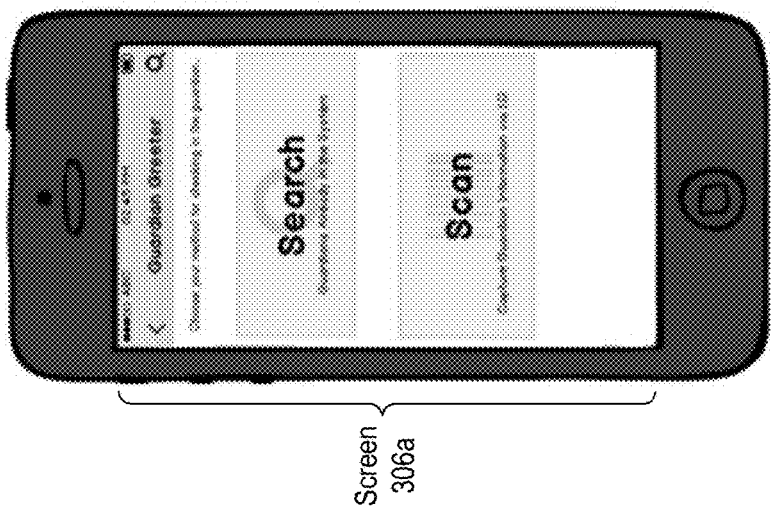
Figure 10E:
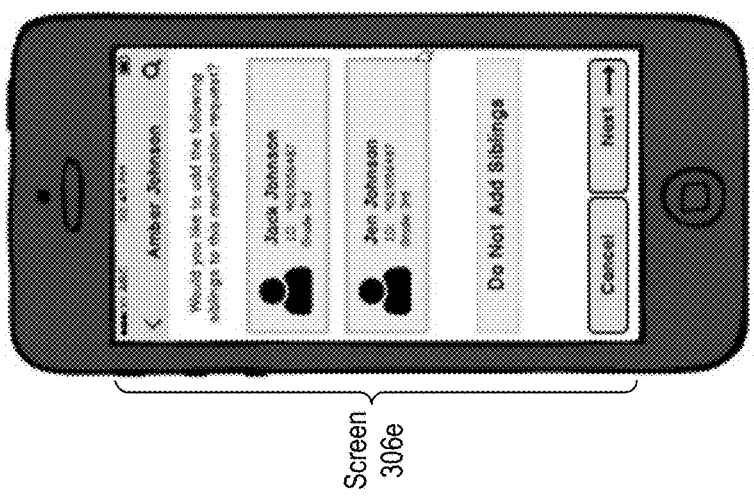
Figure 10D:
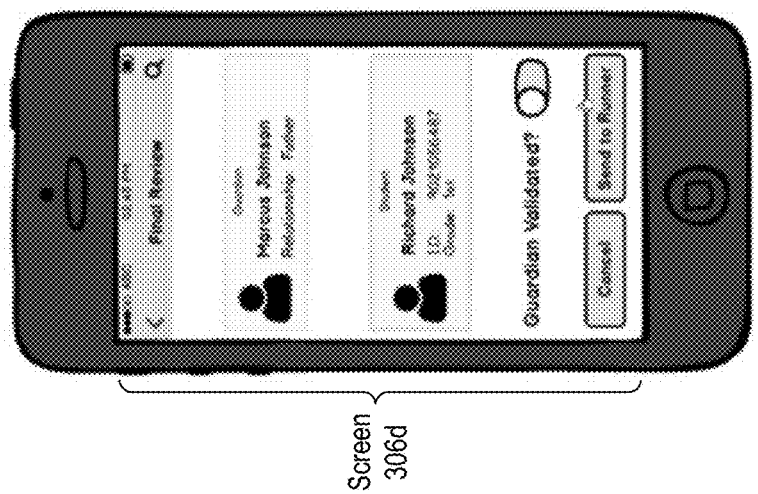
Figure 10G:
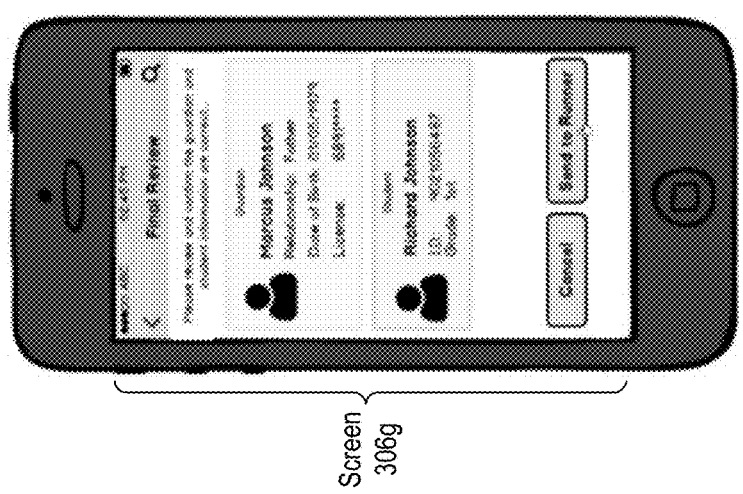
Figure 10F:
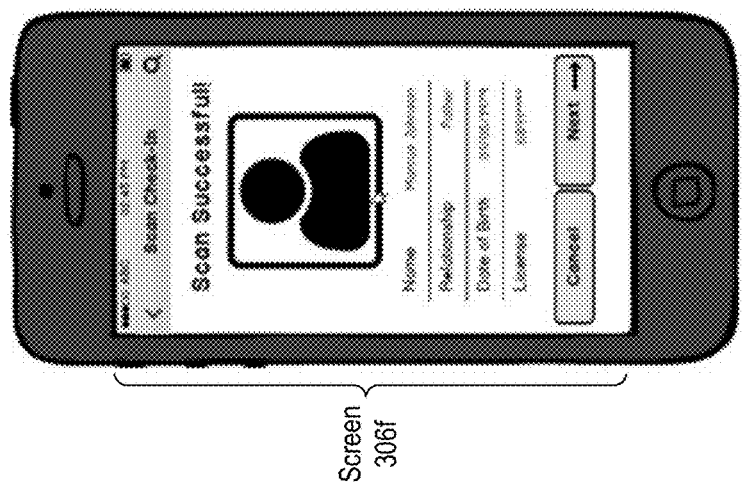

On the screen 306d, the guardian greeter 106 may be presented with information describing the guardian and the associated student. The screen 306d may also include a control to enable the guardian greeter 106 to verify that the guardian's identity has been validated. As shown in the example of FIG. 10D, the screen 306d may include a control to specify that a record is to be added to the runner queue 228, to indicate that the student is to be escorted to the reunification area by a runner. In some implementations, the guardian greeter UI 306 may present a screen 306e to enable the guardian greeter 106 to request that siblings or other students associated with the guardian may be added to the runner request and the reunification request.

Figure 8C:
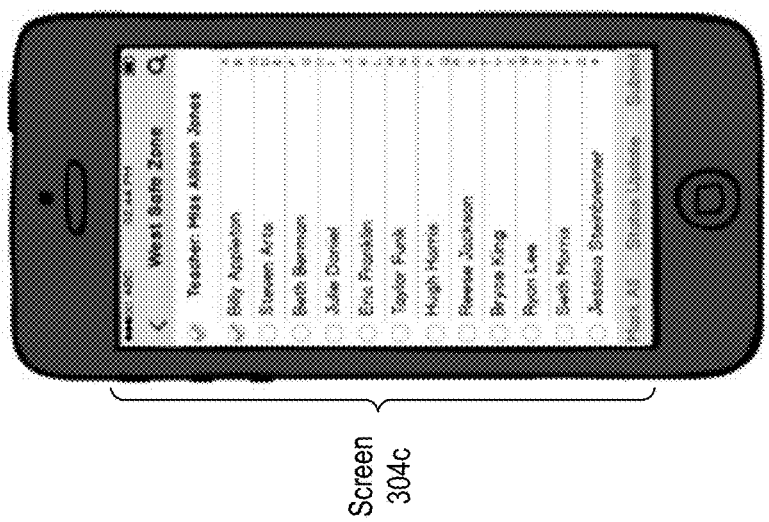
FIGS. 8A-H depict an example computing device executing an application that provides a location supervisor user interface, in accordance with implementations of the present disclosure.
Figure 8B:
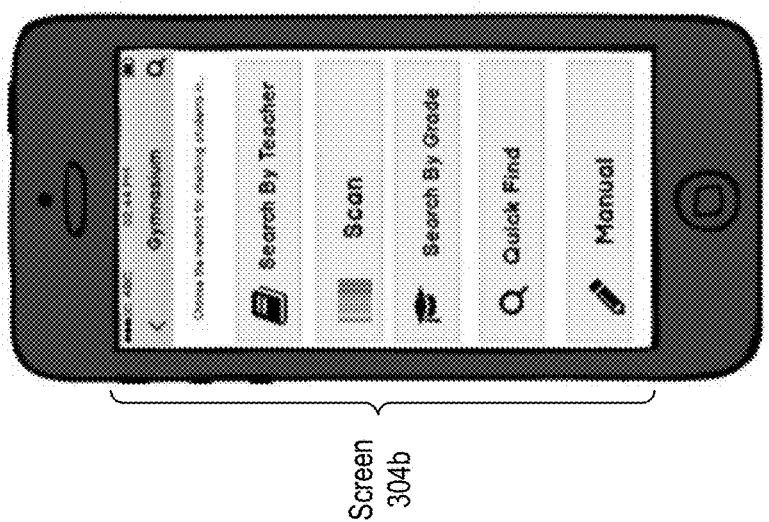
Figure 8A:
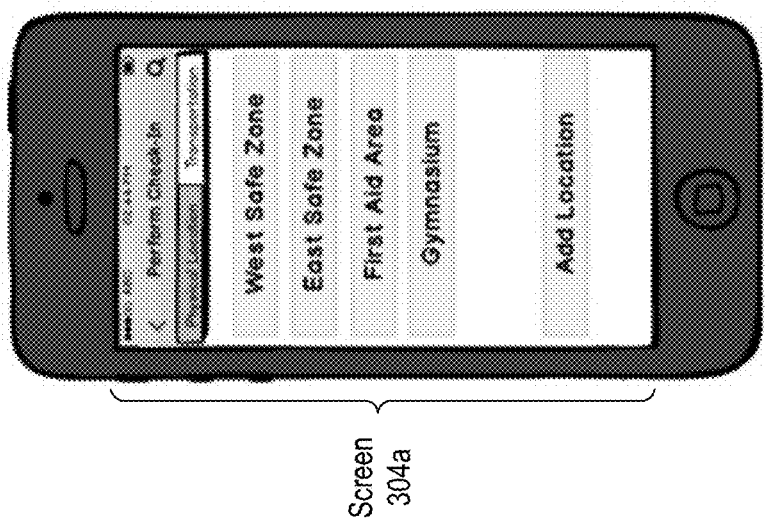
Figure 8E:
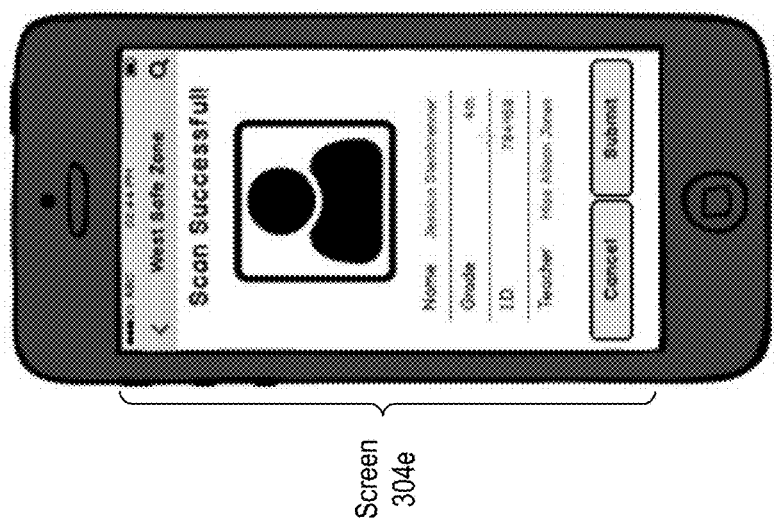
Figure 8D:
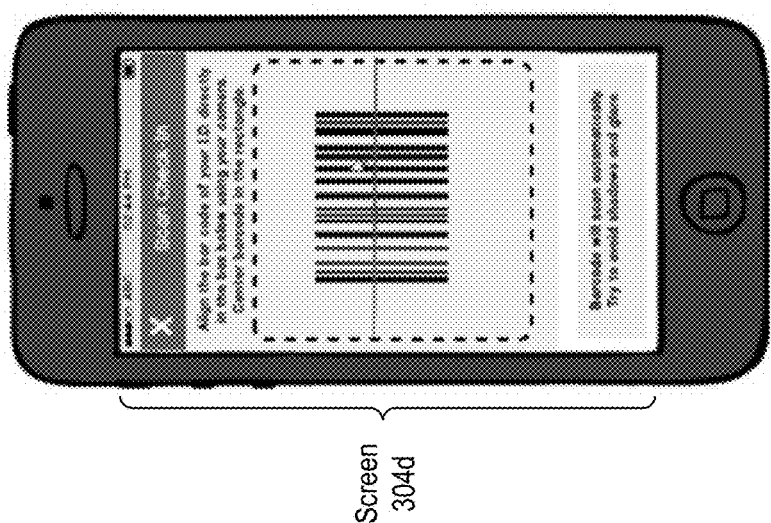
Figure 8H:
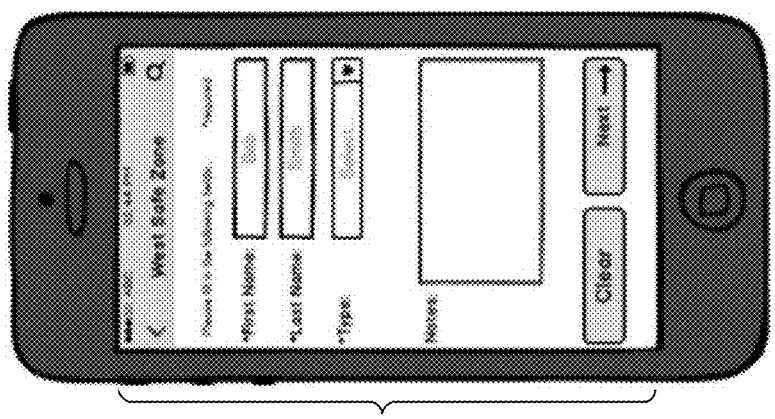
Figure 8G:
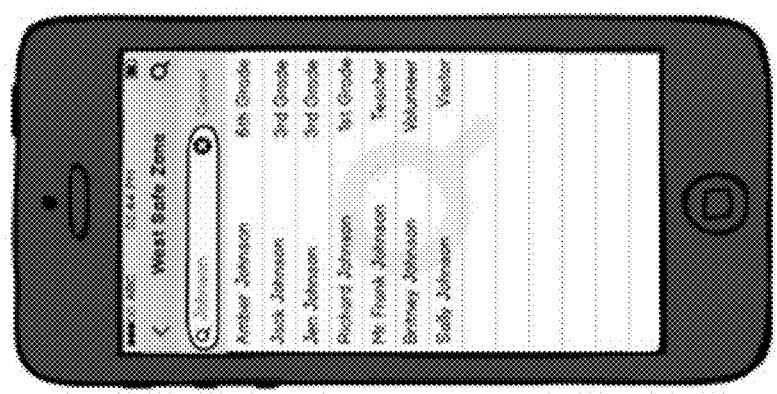
Figure 8F:
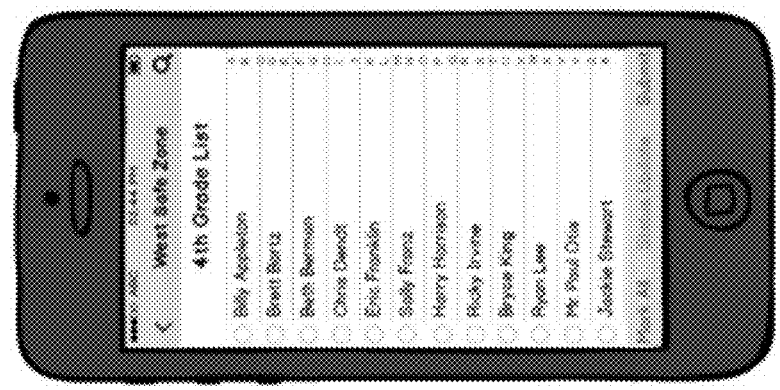

If the guardian greeter 106 selects to verify the guardian's identity through a scan of a guardian credential, the guardian greeter UI 306 may present a screen similar to that shown in FIG. 8D. An image capture device (e.g., camera) of the computing device 314 may capture an image of the guardian's credential, such as a driver's license, passport, and so forth. If the credential includes a barcode of one or more dimensions, software on the computing device 314 may analyze and decode the barcode to determine the encoded information that identifies the guardian. The barcode may encode an identifier of the guardian, such as a name, identification number, or other information that identifies the guardian. If the scan and analysis is successful, guardian information may be requested based on the decoded guardian identifier and the guardian information may be presented in a screen 306f. The guardian greeter UI 306 may present a final review screen 306g to enable the guardian greeter 106 to verify the information before requesting a runner escort the student to the reunification area.

Although examples herein may describe determining the identity of a guardian or student through the scan of a barcode, implementations support the use of other methods to identify individuals. For example, an image of the face of an individual may be captured using an image capture device of the computing device 314, and the captured image may be compared to previously captured image(s) of individual(s) to identify the individual, or verify that the individual is who they claim to be. As another example, a fingerprint of an individual may be scanned using a fingerprint scanner of the computing device 314, and the scanned fingerprint may be compared to previously collected fingerprint data to identify the individual, or verify that the individual is who they claim to be. In some cases, a guardian credential or student credential may include a radio frequency identification (RFID) chip that emits a signal including identity information, and the emitted signal may be received to verify the identity of the individual. A guardian credential or student credential may be included in an identification card, badge, or device (e.g., phone) carried by the individual. A credential may also include an implanted or worn credential. By verifying the identity of the guardian, and verifying that the guardian is authorized to take custody of one or more students, implementations may ensure that students are released into the custody of an authorized guardian and not to unauthorized parties.

In some cases, the guardian greeter UI 306 may present custodial information, alerts, issues, or other information indicating that the guardian is not to be given custody of the student(s). For example, custodial information may be received from one or more other management systems, such as a visitor management system or remote systems (e.g., associated with government agencies). Custodial information may include custody orders indicating that a particular guardian (e.g., parent) is not to be given custody of student (s) on particular days of the week. Custodial information may also include data describing whether the guardian is a registered sex offender, or other information describing a criminal history of the guardian. Custodial information may be presented in the guardian greeter UI 306 to enable the guardian greeter 106 to take the custodial information into account when determining whether to surrender the student(s) to the guardian. Information describing the guardian, such as the guardian's name, image, identification number, associated student(s), appearance, custodial information, and so forth, may be imported from a student information system (SIS) managed by a school or other institution.

Figure 11:
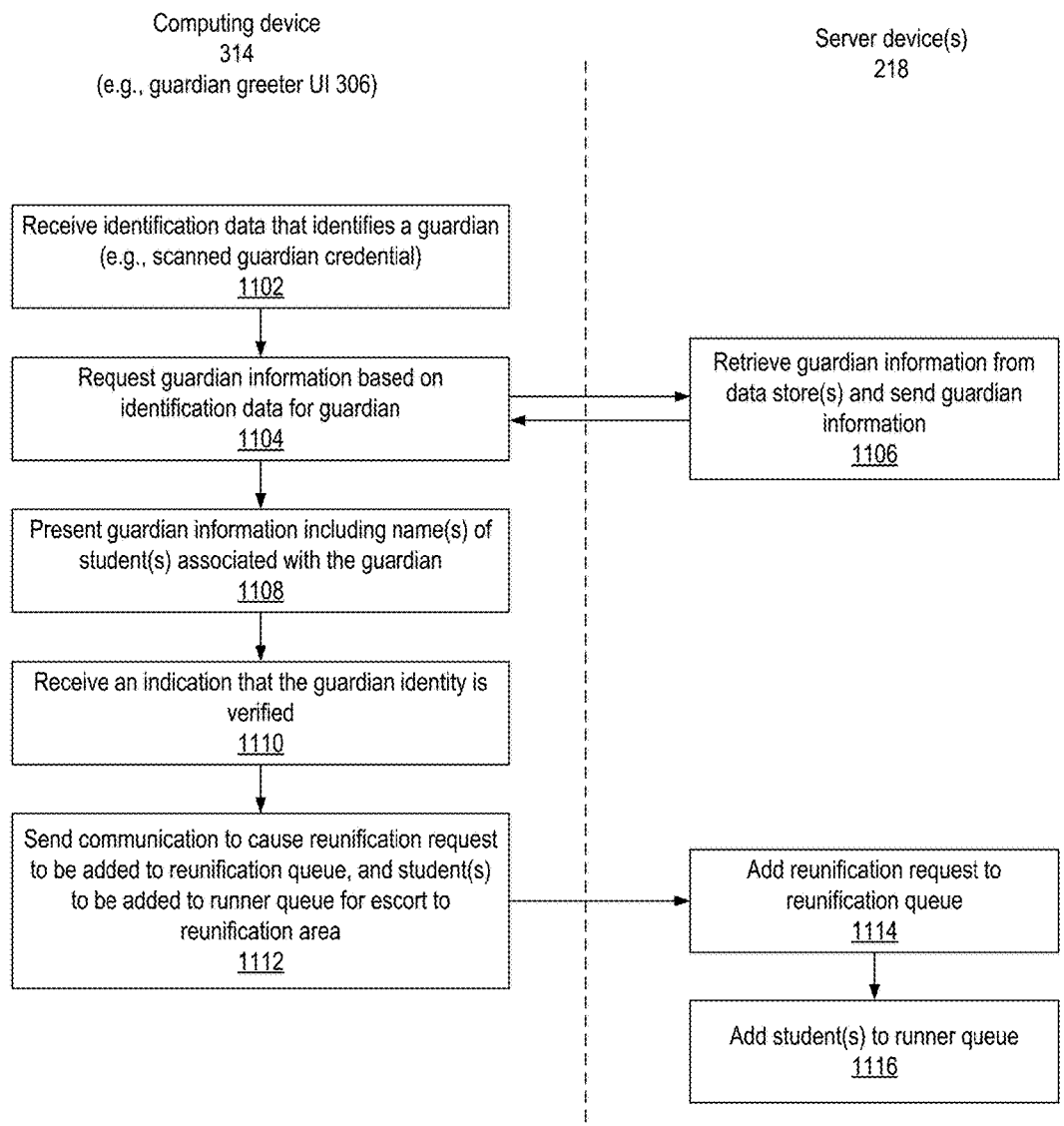
FIG. 11 depicts an example process that may be executed with regard to a guardian greeter user interface, in accordance with implementations of the present disclosure.

FIG. 11 depicts an example process that may be executed with regard to the guardian greeter UI 306, in accordance with implementations of the present disclosure. Operations of the process may be performed by the one or more of the application(s) 316, the incident management service 232, or other software executing on the computing device(s) 314, the server device(s) 218, or elsewhere.

The application 316 may receive (1102), through the guardian greeter UI 306, identification data that identifies a guardian, as described above. In some cases, the guardian identification data may be generated via a scan of a guardian credential, such as an identification card. The guardian identification data may also be received through user input to the guardian greeter UI 306. In some implementations, a guardian greeter 106 may employ the guardian greeter UI 306 to search for a particular student by entering a portion of the student's name. A student record may be retrieved based on the search, the student record listing one or more guardians associated with the student. The guardian identification data may be determined in response to a selection of one of the guardian's listed in the student record presented in the guardian greeter UI 306.

The application 316 may request (1104) guardian information based on the identification data for the guardian. The request may be communicated to the incident management service 232, which may retrieve (1106) the corresponding guardian record from the data store(s) 220 based on the request. The incident management service 232 may send the guardian record to the application 316, which may present (1108) the received guardian information in the guardian greeter UI 306.

The application 316 may receive (1110) an indication that the guardian identity is verified. As described above, the guardian identity may be verified by the guardian greeter 106 if the guardian information received from the incident management service 232 corresponds to the appearance and presented credential(s) of the guardian in the guardian holding area. If the guardian identity is verified, the application 316 may send (1112) a communication to cause a reunification request to be added to the reunification queue 230. The communication may also cause a record to be added to the runner queue 228 to indicate that the student is to be escorted to the reunification area.

The communication may be received by the incident management service 232, which may add (1114) a reunification request to the reunification queue 230. The incident management service 232 may also add (1116) one or more student(s) to the runner queue 228 for escort to the reunification area. In some implementations, the reunification request may specify student(s) and a guardian to be reunified, and may include a reunification status. The reunification request may be created with a status of pending, indicating that reunification has not yet occurred. In some implementations, the reunification request may not be created and added to the reunification queue 230 until after the student has been escorted to the reunification area by a runner 108.

FIGS. 12A-D depict an example computing device 314 executing the application 316 to present screens of the runner UI 308, in accordance with implementations of the present disclosure. The runner UI 308 may present a screen 308a that includes at least a portion of the runner queue 228. In some cases, the runner queue 228 may be requested from the incident management service 232. The runner queue 228 may include one or more records each including the name of a student to be escorted to a destination, such as the reunification area. The record may also include a current location of the student (e.g., west safe zone). In some implementations, the record includes an escort status 1202 of the student. In some implementations, the escort status 1202 may be one of three possible statuses: a first status, indicating that the student is awaiting escort and no runner 108 has been assigned; a second status, indicating that the student is awaiting escort and a runner 108 has been assigned; or a third status, indicating that the student is in transit and the runner 108 is currently escorting the student to the destination. Implementations also support the use of more or fewer escort statuses, or different escort statuses. In some implementations, the presence of a student's name in the runner queue 228 may itself indicate that the student has a status of currently being escorted, and the record may not include status indications other than the student's name and location. Accordingly, an escort status may include the presence of a student name and/or student location in the runner queue 228. One or more of the student name, location, or escort status may be presented in the presentation of the runner queue 228 in the runner UI 308, or in other UI(s).

In some implementations, a graphical image, icon, or symbol may be presented in the runner UI 308 to indicate different escort statuses. In the examples of FIGS. 12A-D, a white circle indicates the first status, a circle that is half black and half white indicates the second status, and a black circle indicates the third status. Implementations also support the use of other escort status indicators, presented as one or more of text, colors, symbols, icons, emoji, shapes, lines, images, graphics, animations, sounds, and so forth.

A runner 108 may select one of the records in the presented runner queue 228, and the runner UI 308 may present a screen 308b that includes details regarding the student to be escorted. The selection of the runner queue record may indicate that the runner 108 is to escort the student, and the runner 108 may be assigned to escort the student. The screen 308b may indicate the name of the student to be escorted, their current location, their teacher, their grade, or other information. The screen 308b may also indicate the name of the assigned runner 108, the destination (e.g., reunification area), the guardian of the student, and the timestamp (e.g., date, time, or date and time) when the runner queue record was created and added to the runner queue 228.

In the example of FIGS. 12A-D, the runner 108 has selected to escort a particular student by selecting the corresponding record in the runner queue 228. In response to the runner's selection, the escort status 1202 of the student is changed, as shown in screen 308a, from the first status (e.g., no runner assigned) to the second status (e.g., runner assigned and student awaiting escort). When the runner 108 arrives at the current location of the student, the runner 108 may select the record again to change the escort status 1202 from the second status to the third status (e.g., student in transit, escorted by runner), as shown in screen 308c.

After the runner 108 has escorted the student to the destination, the runner 108 may select the record again to indicate arrival at the destination. This selection may cause the runner UI 308 to present a confirmation dialog to enable the runner 108 to confirm that the escort is complete and the student has arrived at the destination. If the runner 108 gestures in the confirmation dialog to confirm a completed escort, the record may be removed from the runner queue 228. In some implementations, after the runner 108 has escorted the student to the destination, the runner 108 may be met at the destination by a reunification officer 110 who may perform an update to the record to indicate that responsibility for the reunification request has been transferred from the runner 108 to the reunification officer 110. The record may be removed from the runner queue 118 by the reunification officer 110 to indicate that the reunification officer 110 has responsibility to manage the completion of the process to reunify the escorted student(s) with their guardian. In some implementations, a change in the escort status 1202 may also be reflected in the reunification request for the student, as described with reference to FIGS. 14A-C.

Figure 13A:
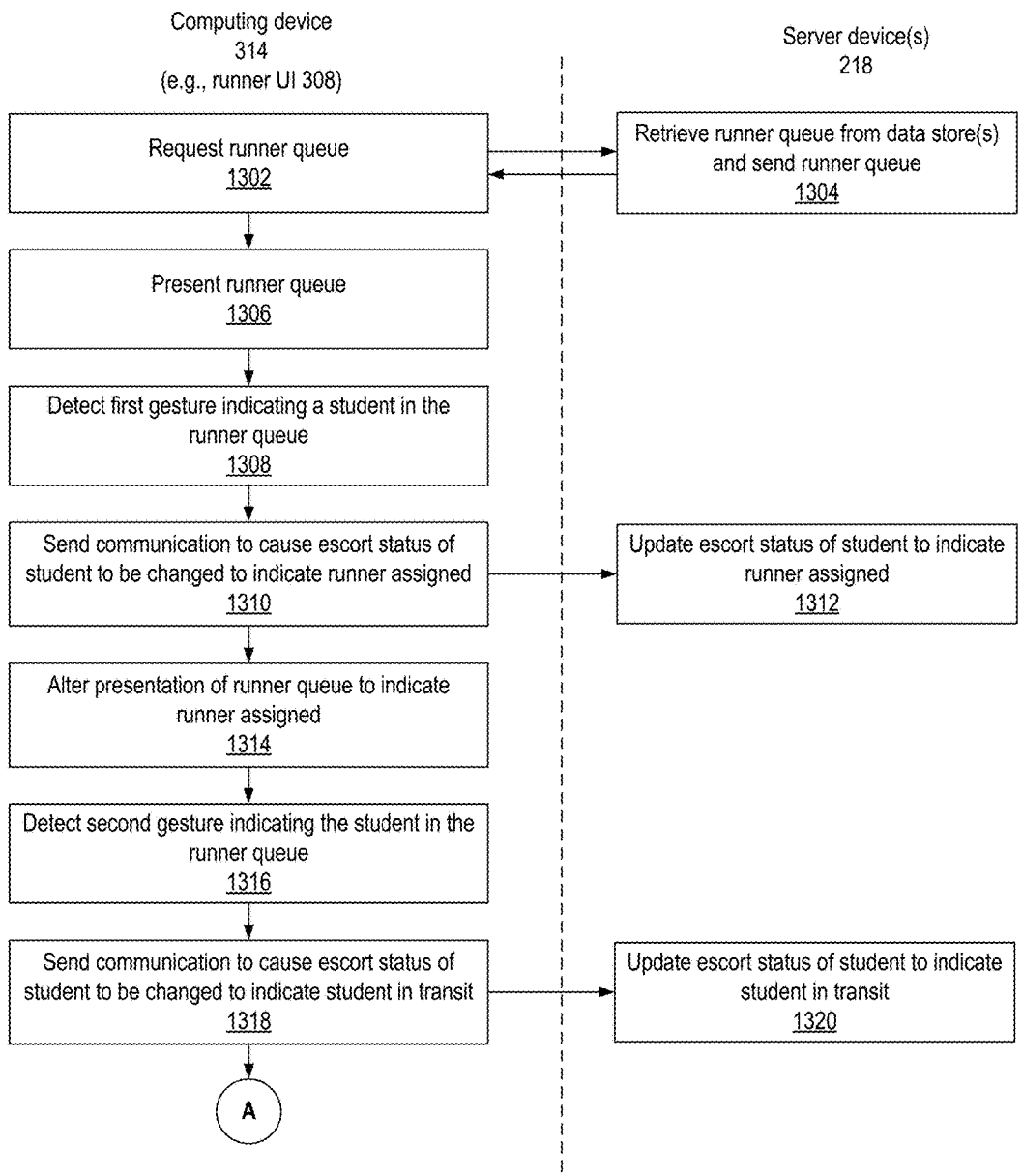
FIGS. 13A and 13B depict an example process that may be executed with regard to a runner user interface, in accordance with implementations of the present disclosure.
Figure 13B:
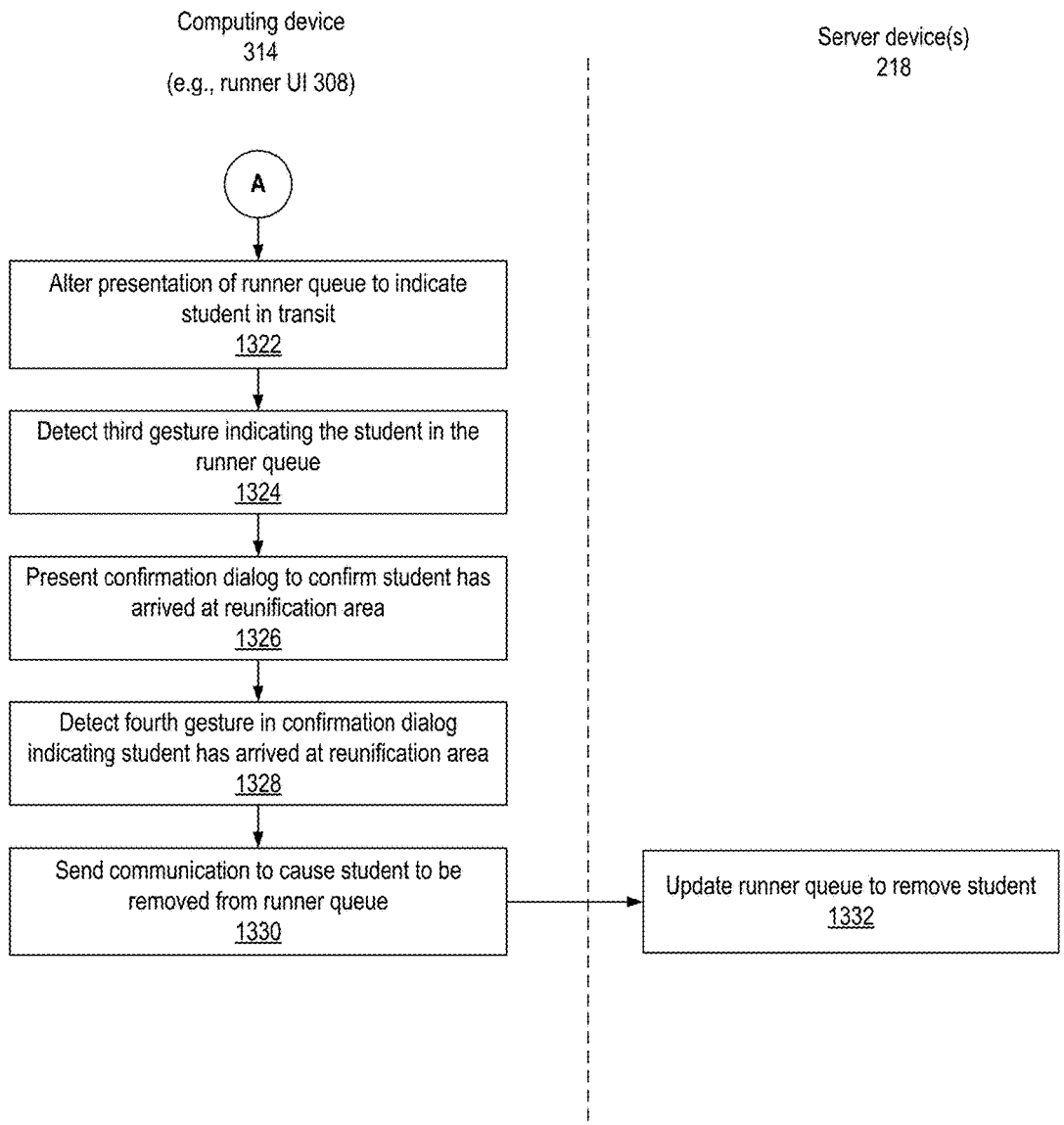

FIGS. 13A and 13B depict an example process that may be executed with regard to the runner UI 308, in accordance with implementations of the present disclosure. Operations of the process may be performed by the one or more of the application(s) 316, the incident management service 232, or other software executing on the computing device(s) 314, the server device(s) 218, or elsewhere.

The application 316 may request (1302) the runner queue 228 from the incident management service 232. In response to the request, the incident management service 232 may retrieve (1304) the runner queue 228 from the data store(s) 220 and send the runner queue 228 to the application 316. The application 316 may present (1306) the runner queue 228, or at least a portion thereof, in the runner UI 308.

The application 316 may detect (1308) a first gesture indicating one of the students (e.g., a record) in the runner queue 228. In response to the first gesture, a communication may be sent (1310) to cause the escort status 1202 of the student to be changed from the first status to the second status, indicating a runner 108 has been assigned. The communication may be received by the incident management service 232, which may update (1312) the escort status 1202 of the student to indicate the second status (e.g., runner assigned).

The application 316 may alter (1314) the presentation of the runner queue 228 in the runner UI 308 to indicate the change in escort status 1202.

The application 316 may detect (1316) a second gesture indicating the student in the runner queue 228 presented in the runner UI 308. In response to the second gesture, a communication may be sent (1318) to cause the escort status 1202 of the student to be changed from the second status to the third status, indicating that the student is in transit and currently being escorted by the runner 108. The communication may be received by the incident management service 232, which may update (1320) the escort status 1202 of the student to indicate the third status (e.g., student in transit). The process may continue as described with reference to FIG. 13B.

The application 316 may alter (1322) the presentation of the runner queue 228 in the runner UI 308 to indicate the change in escort status 1202.

Figures 12A, 12B:
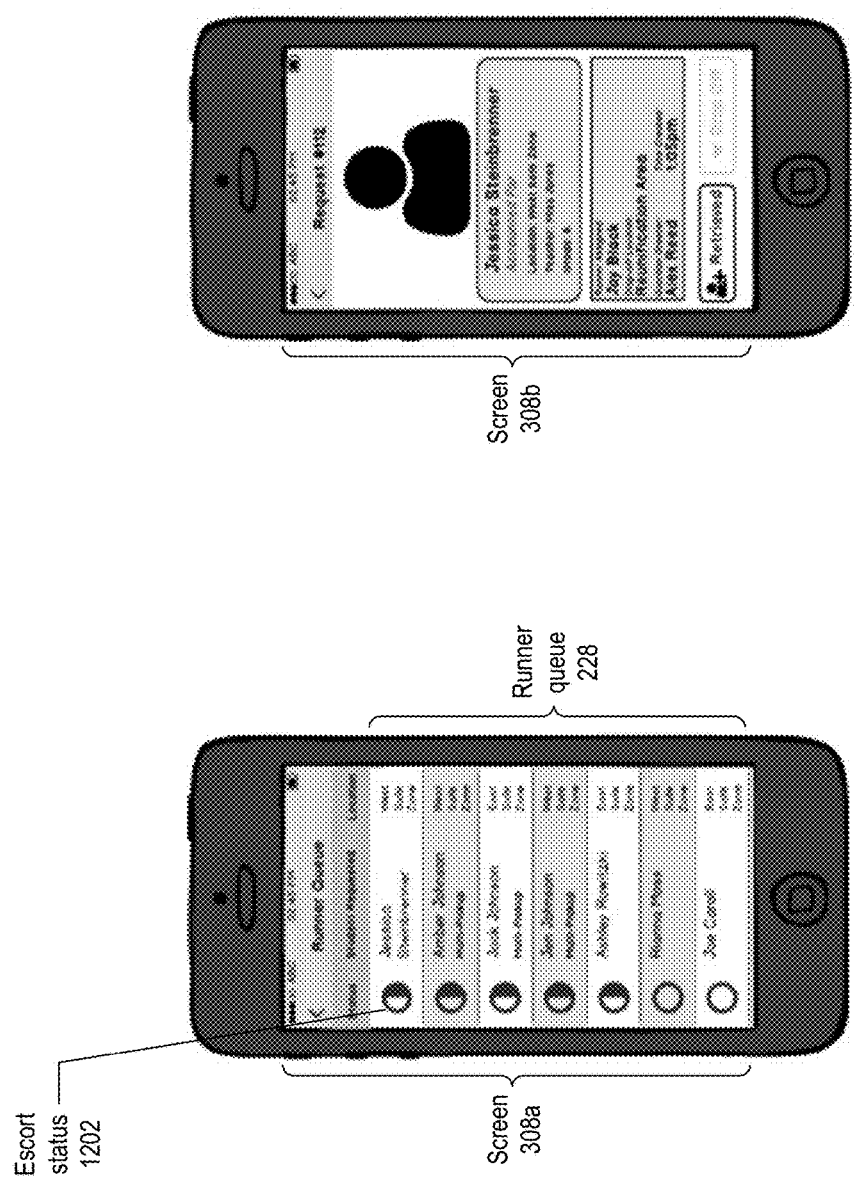
FIGS. 12A-D depict an example computing device executing an application that provides a runner user interface, in accordance with implementations of the present disclosure.
Figures 12C, 12D:
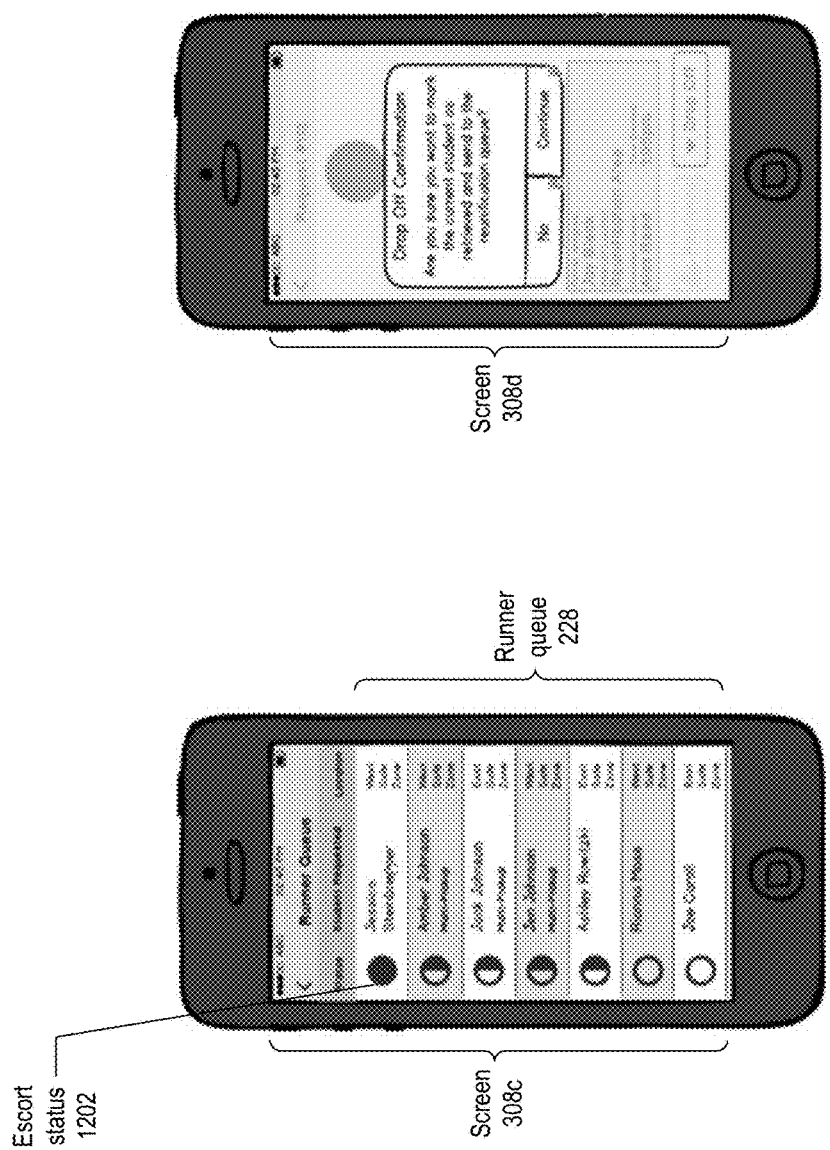

The application 316 may detect (1324) a third gesture indicating the student in the runner queue 228 presented in the runner UI 308. In response to the third gesture, the application 316 may present (1326) a confirmation dialog to confirm the student has arrived at the destination, as shown in FIG. 12D.

In response to detecting (1328) a fourth gesture in the confirmation dialog, indicating the student has arrived, a communication may be sent (1330) to cause the student to be removed from the runner queue 228. In some implementations, the student may be removed from the runner queue 228 in response to a gesture made in the reunification officer UI (e.g., by the reunification officer), as described above. The communication may be received by the incident management service 232, which may update (1332) the runner queue 228 in the data store(s) 220 to remove the runner request record corresponding to the student.

Although the example of FIGS. 13A and 13B describes escorting a single student, in some cases a runner 108 may escort multiple students. In such cases, the updates to the runner queue 228 may alter multiple records in the runner queue 228 corresponding to the multiple escorted students. By employing a runner queue 228 to manage runners 108, implementations provide for a process by which students may be escorted to a reunification area more reliably and more efficiently than traditional practices, providing a better experience for all parties involved.

In some implementations, a reunification officer 110 may be assigned the responsibility for overseeing the reunification of student(s) with a guardian. In such cases, the reunification officer UI 310 includes functionality that enables a user to update a reunification request status to indicate that the student(s) have arrived at the reunification area and that the reunification officer 110 has assumed responsibility for the student(s). The student(s) may then be removed from the runner queue 228. In such cases, the runner UI 308 may not include functionality to enable the runner 108 to alter the reunification status of the student(s).

Figures 14A, 14B:
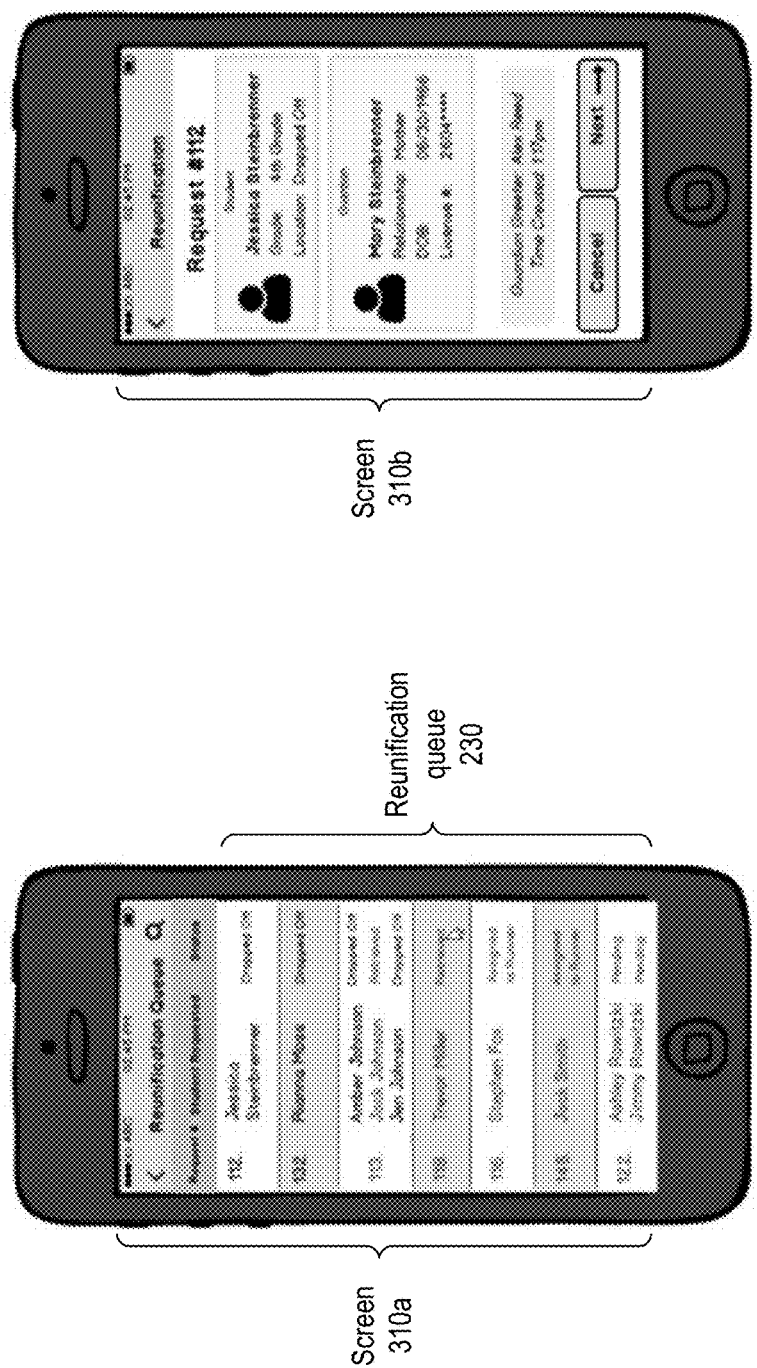
FIGS. 14A-C depict an example computing device executing an application that provides a reunification officer user interface, in accordance with implementations of the present disclosure.
Figure 14C:
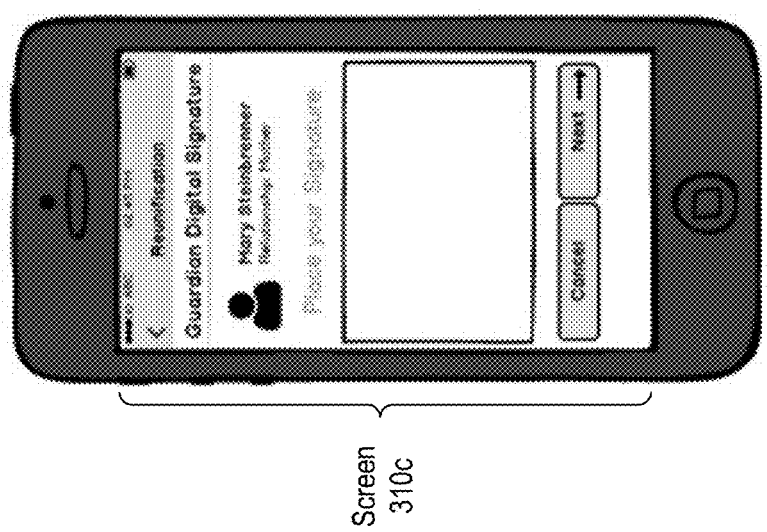

FIGS. 14A-C depict an example computing device 314 executing the application 316 to present the reunification officer UI 310, in accordance with implementations of the present disclosure. The reunification officer UI 310 may present a screen 310*a* that includes at least a portion of the reunification queue 230. The reunification queue 230 may be requested from the incident management service 232. As shown in the example of FIG. 14A, the reunification queue 230 may include any number of records each corresponding to a reunification request. A reunification officer 110 may select one of the records by gesturing in the reunification officer UI 310, and in response the reunification officer UI 310 may present a screen 310*b* that includes the details of the selected reunification request. The screen 310*b* may present, for the reunification request, the corresponding guardian and one or more students to be reunified with the guardian, pending the verification of the identities of the parties to be reunified. The screen 310*b* may also present a request number for the reunification request, the name of the guardian greeter 106 who created the reunification request, and a timestamp indicating when the reunification request was created and added to the reunification queue 230. A reunification request may include the names of the student(s) and guardian to be reunified, as well as other details of the reunification request.

The screen 310*b* may also indicate a current location or status of the student(s). For example, the reunification request may be updated to reflect the current location of the student(s) as the student(s) are escorted to the student holding area and from the student holding area to the reunification area. The status may reflect the escort status of the student(s), such as whether a runner 108 has not yet been assigned, shown in FIG. 14A as a status of "pending." The status may indicate that a runner 108 has been assigned, shown in FIG. 14A as a status of "assigned to runner." The status may indicate that the runner 108 is currently escorting the student(s) to the reunification area, shown in FIG. 14A as a status of "retrieved." The status may also indicate that the student has arrived at the destination area, as confirmed by the runner 108 or the reunification officer 110, shown in FIG. 14A as a status of "dropped off" or similar designation. In some cases, the various records of the reunification queue 230 may be presented in different colors, or with otherwise differing appearances, to indicate different statuses. For example, if the student(s) have arrived at the reunification area, the corresponding reunification record may be presented as a first color (e.g., black), and if the student(s) have not yet arrived, the corresponding reunification record may be presented as a second color (e.g., red).

The screen 310*b* may provide a control (e.g., a "next" button) to enable the reunification officer 110 to proceed with the reunification of the guardian and the student(s). In some implementations, the reunification officer UI 310 may provide screen(s) for scanning the guardian credential, the student credential(s), or both the guardian credential and the student credential(s), to verify the identities of the guardian and student(s) as described above. The identities may also be verified by the reunification officer 110 based on a comparison of the appearance, description, or credential(s) of the individuals with information previously received for the individuals. If the identities are verified, the reunification officer UI 310 may present a screen 310*c* to collect a signature of the guardian. In some implementations, the signature may be stored for future confirmation that the reunification occurred. In some implementations, the signature may be compared to a previously stored signature of the guardian to provide a further confirmation of the identity of the guardian. Implementations also support the collection and storage of other confirmation data from the guardian instead of or in addition to a signature. For example, the screen 310*c* may be configured to collect a fingerprint, capture a photo of the reunified guardian and student, or generate other confirmation data.

The reunification officer UI 310 may include additional functionality. For example, the reunification officer UI 310 may present a current status or location of a student, to enable the reunification officer 110 to keep guardians updated on the current status or location of students. The reunification officer UI 310 may also document a digital signature of the guardian, or capture an image of the reunified guardian and student as proof of reunification. The reunification officer UI 310 may also enable the reunification officer 110 to request that communications (e.g., emails, text messages, etc.) be delivered to other emergency contacts when the student has been reunified with a guardian.

Figure 15:
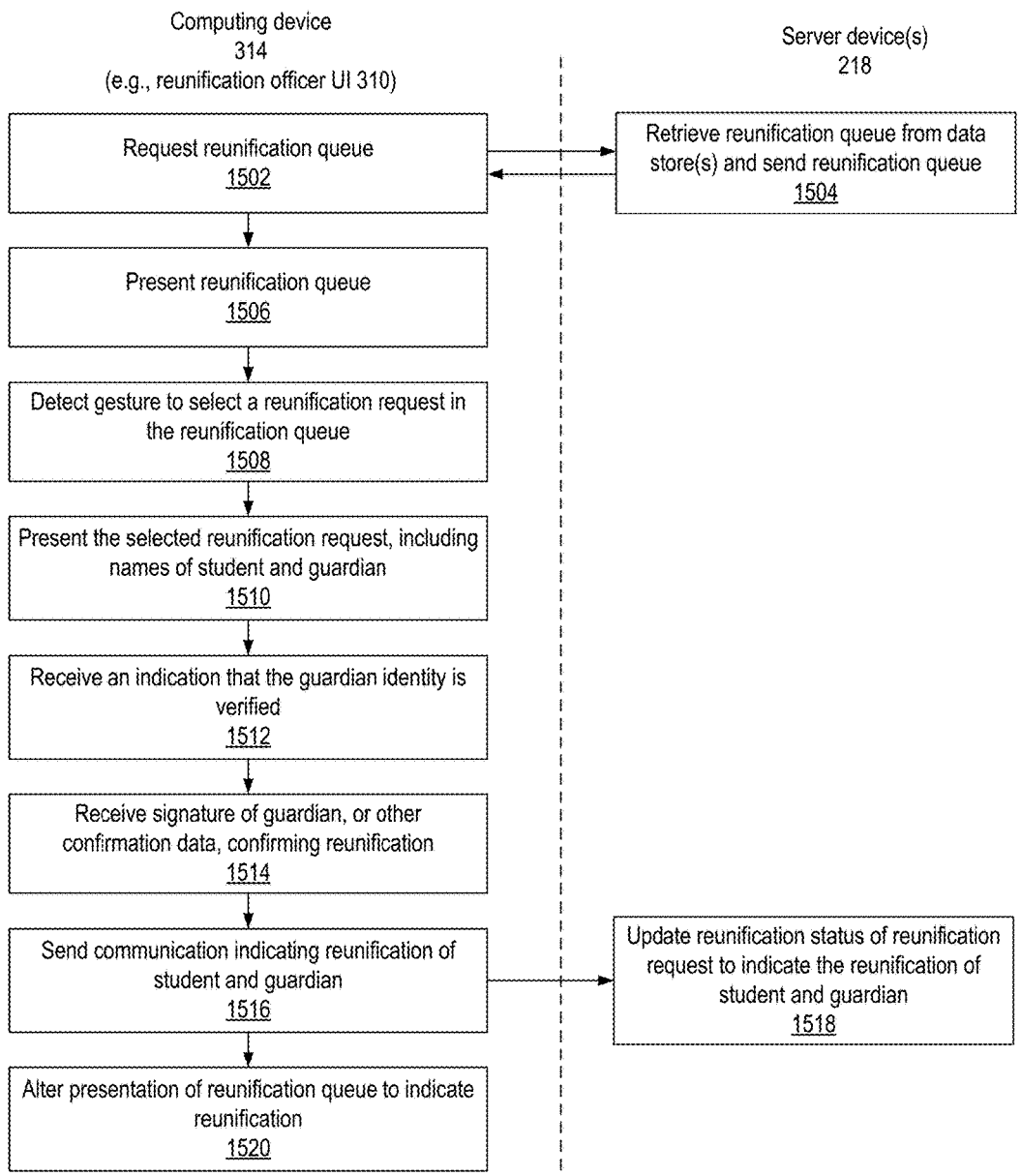
FIG. 15 depicts an example process that may be executed with regard to a reunification officer user interface, in accordance with implementations of the present disclosure.

FIG. 15 depicts an example process that may be executed with regard to the reunification officer UI 310, in accordance with implementations of the present disclosure. Operations of the process may be performed by the one or more of the application(s) 316, the incident management service 232, or other software executing on the computing device(s) 314, the server device(s) 218, or elsewhere.

The application 316 may request (1502) the reunification queue 230 from the incident management service 232. In response, the incident management service 232 may retrieve (1504) the reunification queue 230 from the data store(s) 220 and send the reunification queue 230 to the application 316. The application 316 may present (1506) the reunification queue 230, or at least a portion thereof, in the reunification officer UI 310.

The application 316 may detect (1508) a gesture to select a reunification request in the reunification queue 230 presented in the reunification officer UI 310. The application 316 may present (1510) the selected reunification request, including the names of the student(s), the guardian, or other information as described above.

The application 316 may receive (1512) an indication that the identity of the guardian has been verified, such that the reunification may proceed. The application 316 may also receive an indication that the identity of the student(s) has also been verified.

The application 316 may receive (1514) the signature of the guardian or other confirmation data that confirms the reunification has occurred. In some cases, the signature or other confirmation data may be stored in the data store(s) 220.

The application 316 may send (1516) a communication to indicate that the reunification between student(s) and guardian is completed. In response to the communication, the incident management service 232 may update (1518) the reunification status of the reunification request to indicate the reunification of the student(s) with the guardian. The student record(s) for the student, or the guardian record of the guardian, may also be updated to indicate the reunification has occurred. In some implementations, a notification may also be sent to other guardian(s), or emergency contact(s), associated with the student(s) to indicate that the student(s) have been reunified with the guardian.

In some implementations, the reunification officer UI 310 may enable a user (e.g., reunification officer or other personnel) to authorize the release of a student (e.g., on the student's own recognizance) even in the absence of a guardian to pick them up. For example, students (e.g., older students) may be allowed to leave the area during certain times of day (e.g., lunch time) and/or under particular circumstances (e.g., a HVAC failure leads to an unexpected school closure). The reunification officer UI 310 may provide feature(s) that allow a user to check out the student by entering information such as: the name or ID number of the student being released; the date and/or time of release; the reason for releasing the student; the destination of the student; the mode of transportation to be used by the student (e.g., car, on foot, public transit, etc.), and so forth.

The application 316 may alter (1520) the presentation of the reunification queue 230 in the reunification officer UI 310 to indicate that the reunification has occurred. In some cases, the reunification record may be removed from the presented reunification queue 230 following the reunification.

FIGS. 16A-M depict an example computing device 314 executing the application 316 to present the incident commander UI 312, in accordance with implementations of the present disclosure. In some implementations, the incident commander UI 312 may present one or more dashboards to provide an incident commander 112 with information regarding the status (e.g., an overview) of the response to the emergency incident. The dashboards may include, but are not limited to, a status dashboard, a location dashboard, a visitor dashboard, and a reunification dashboard. The user may select a dashboard in screen 312*a* of the incident commander UI 312. The visitor dashboard may present information received from a visitor management system that tracks information regarding visitors currently in the area (e.g., school), such as volunteers, contractors, vendors, media, emergency responders, parents, family members, and so forth.

Figure 16C:
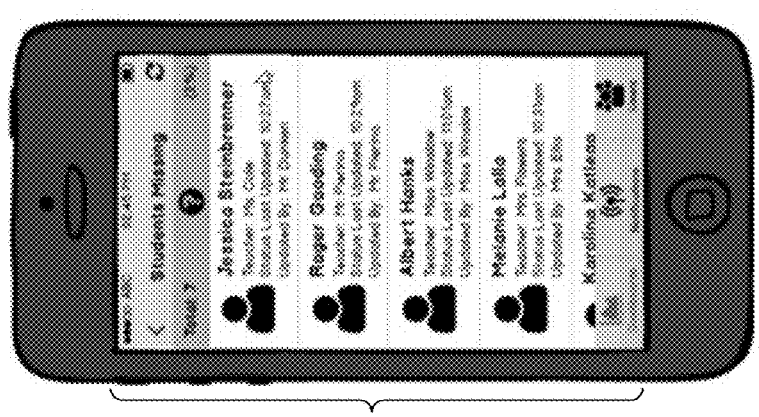
FIGS. 16A-M depict an example computing device executing an application that provides an incident commander user interface, in accordance with implementations of the present disclosure.
Figure 16B:
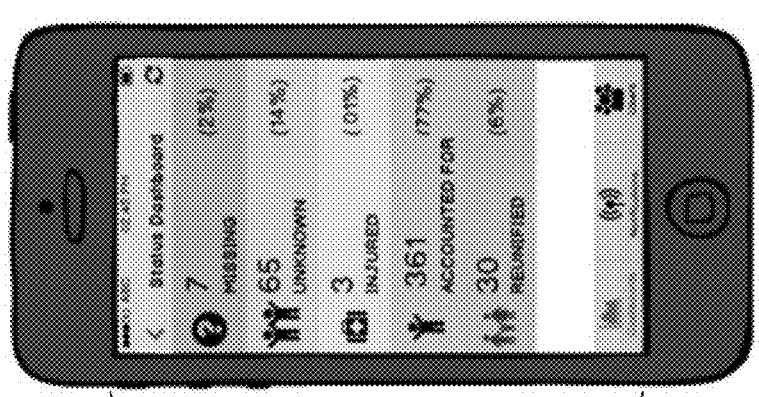
Figure 16A:
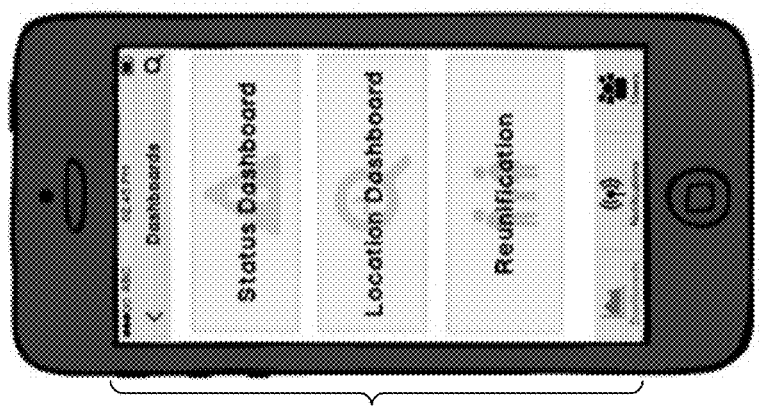

FIG. 16B depicts an example of a status dashboard. The status dashboard may include a screen 312*b* which presents various status categories for students. In the example shown, students may be in one of five status categories: missing, unknown, injured, accounted for, or reunified. Implementations also support the use of more, fewer, or different status categories to describe student status. Screen 312b may present, for each status category, a number of students in the status category, a proportion of students in the status category, or both the number and proportion of students in the status category. In some implementations, the application 316 may respond to a gesture in one of the status categories by presenting a screen 312c listing the student(s) in that selected status category along with the corresponding student information for each student. In some implementations, the application 316 may respond to a gesture on a student by presenting a screen 312d showing a list of status or location updates for the student over time.

Figure 16E:
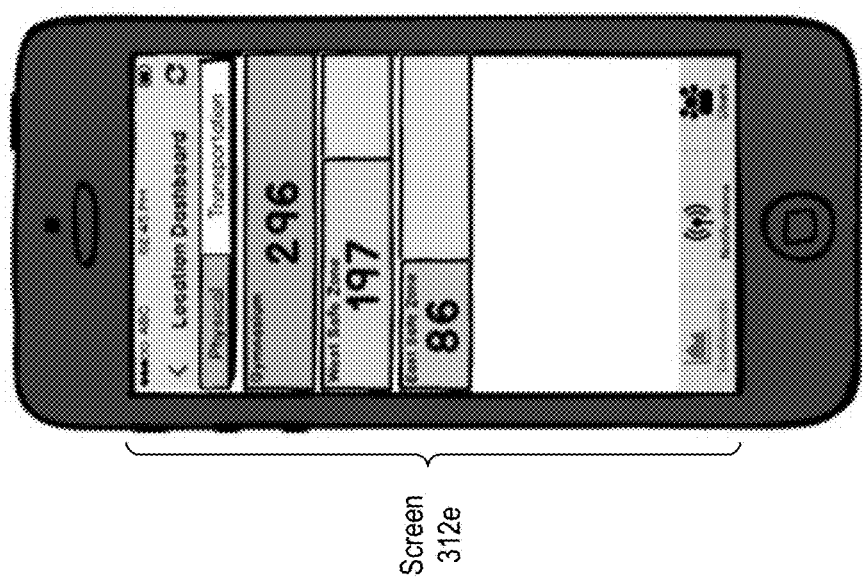
Figure 16D:
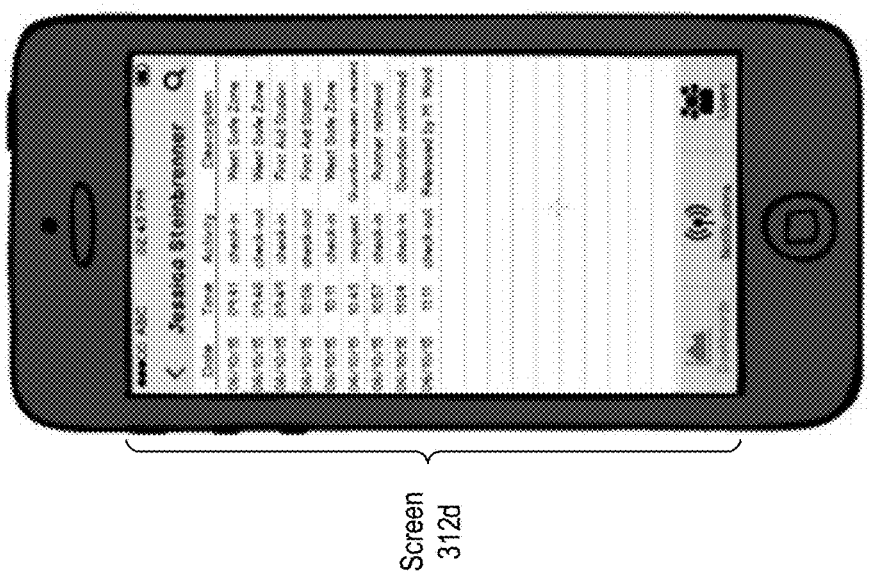

FIG. 16E depicts an example of a location dashboard. The location dashboard may include a screen 312e which presents various locations for students. In the example shown, students may be at one of three possible locations. Implementations support the use of any number of locations in tracking students. Screen 312e may present, for each location, a number of students currently at that location, a proportion of students currently at that location, or both the number of proportion of students at the location. In some implementations, the application 316 may respond to a gesture in one of the locations by presenting a screen 312f listing individuals (e.g., students, faculty, or others) currently listed at that location according to the incident data 222. The individuals may be sortable, or presentable, based on various criteria such as grade, teacher, and so forth.

Figure 16G:
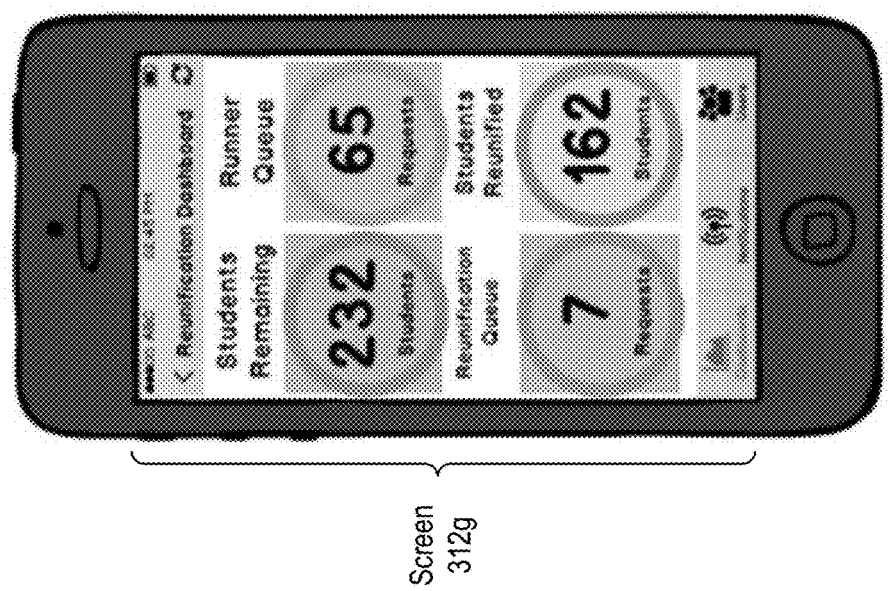
Figure 16F:
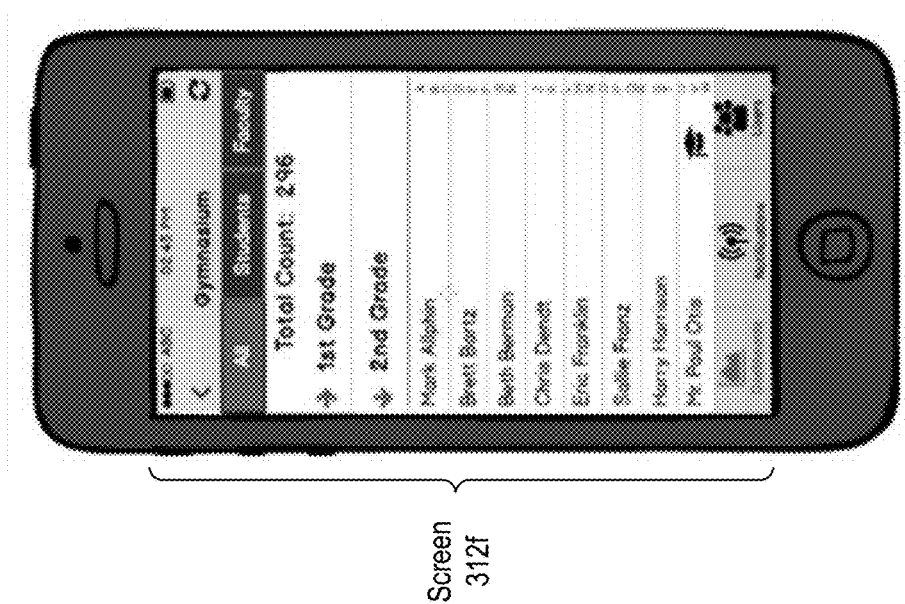
Figure 16J:
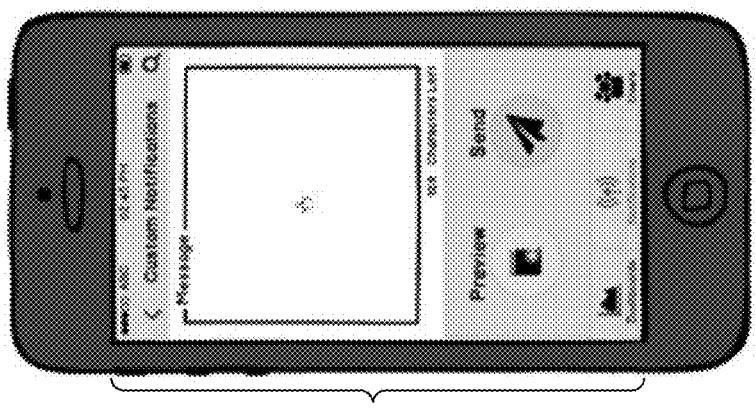
Figure 16I:
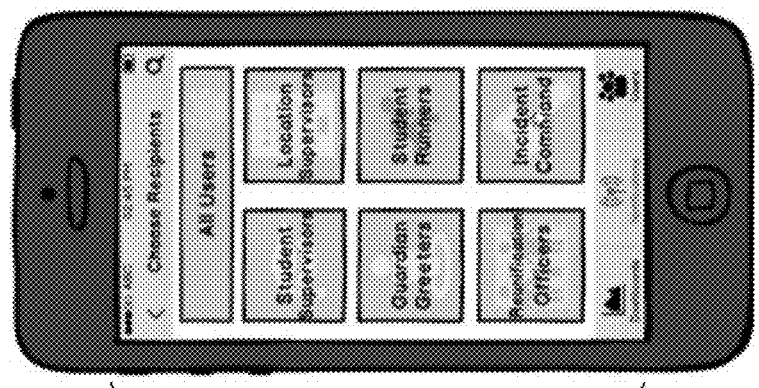
Figure 16H:
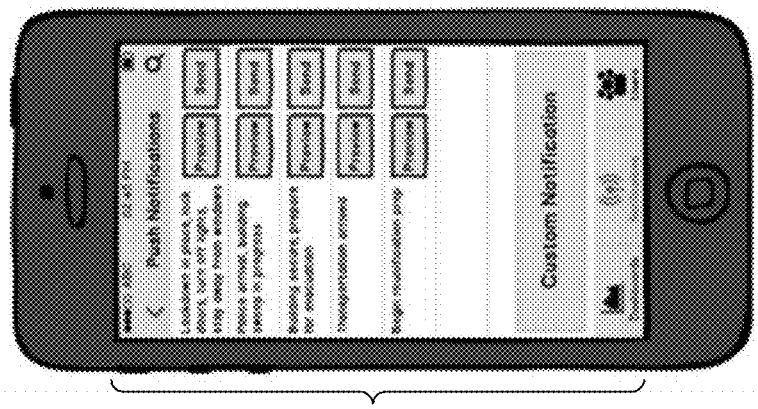

FIG. 16G depicts an example of a reunification dashboard. The reunification dashboard may include a screen 312g which presents the number, proportion, or both number and proportion of students of various statuses. In the example shown, the reunification dashboard shows: the number of students (e.g., 232) currently remaining to be reunified with a guardian; the number of reunification requests (e.g., 7) currently in the reunification queue 230; the number of runner requests (e.g., 65) currently in the runner queue 228; and the number of students (e.g., 162) who have been reunified with a guardian. Implementations also support more, fewer, or different statuses to be presented in the dashboard(s).

In some implementations, the incident commander UI 312 may enable an incident commander 112 to communicate with various parties. Such communications may employ any communication protocol. In some cases, such communications may be sent as push notifications, text messages, or IP-based messaging. The application 316 may present a screen 312h in the incident commander UI 312 enabling the incident commander 112 to select one of a list of predetermined (e.g., pre-drafted) notifications to send. The screen 312h may provide control(s) to present a preview of the notification(s), and control(s) to select a notification to send. The screen 312h may also include a control to enable a user to draft a custom notification, through a text entry dialog in screen 312j. After selecting a predetermined notification, or drafting a custom notification, a gesture on the "send" control in screen 312h or screen 312j may cause the application 316 to present screen 312i to enable the user to select recipients of the notification. In some cases, the screen 312i may enable the user to select one or more sets of recipients, such as student supervisors 102, location supervisors 104, guardian greeters 106, runners 108, reunification officers 110, or incident commanders 112. The screen 312i may also enable the user to select all users as recipients. In some implementations, the screen 312i may enable the user to select one or more particular users as recipients. By providing predetermined notifications, implementations may enable notifications to be sent quickly by an incident commander 112 without further drafting of text.

Figure 16M:
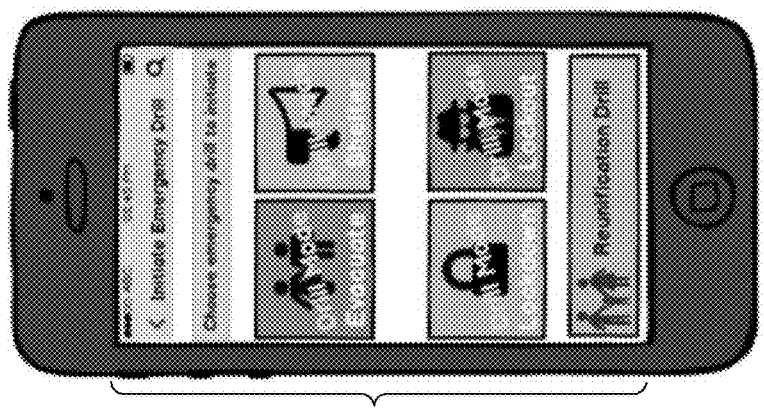
Figure 16L:
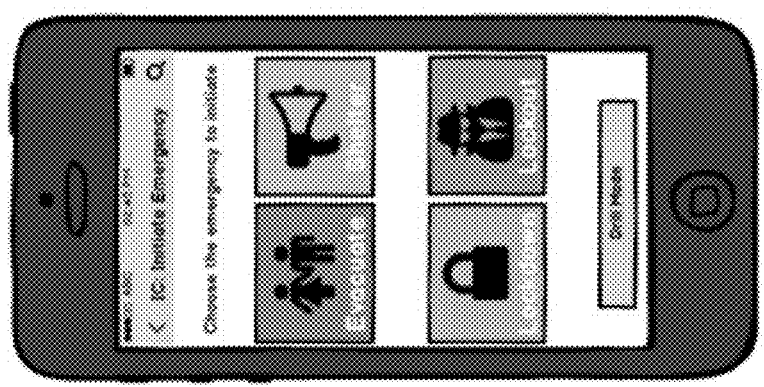
Figure 16K:
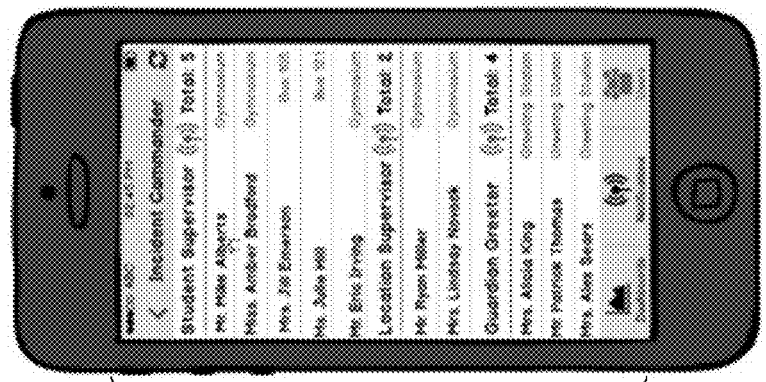

In some implementations, the incident commander UI 312 may include a screen 312k that presents one or more lists of various personnel in the various roles, such as a list of student supervisors 102, a list of location supervisors 104, a list of guardian greeters 106, and so forth. The screen 312k may present the current location of each listed individual, and may provide a control to enable a notification to be sent to a selected group of users as shown in FIG. 16K. The screen 312k may also present information to the incident commander 112 or other user indicating whether the various personnel (e.g., student supervisor(s) 102, etc.) have taken roll for a set of students (e.g., their class). The screen 312k may also indicate to the incident commander 112 that the personnel did not have a class full of children to be accounted for.

The incident commander UI 312 may provide a screen 312l that enables an incident commander 112 to initiate a response to an emergency incident. Such responses may include evacuation as described herein. Responses may also include sheltering, lockdown, secure perimeter, or other types of responses. In some implementations, the incident commander UI 312 may enable an incident commander 112 to initiate a drill or test of the emergency response system using screen 312m. As shown in FIG. 16M, any of the available emergency responses may be simulated in a drill. The screen 312m may also enable the incident commander 112 to initiate a reunification drill to test the reunification process described herein. The reunification drill is described further with reference to FIG. 18.

Figure 17:
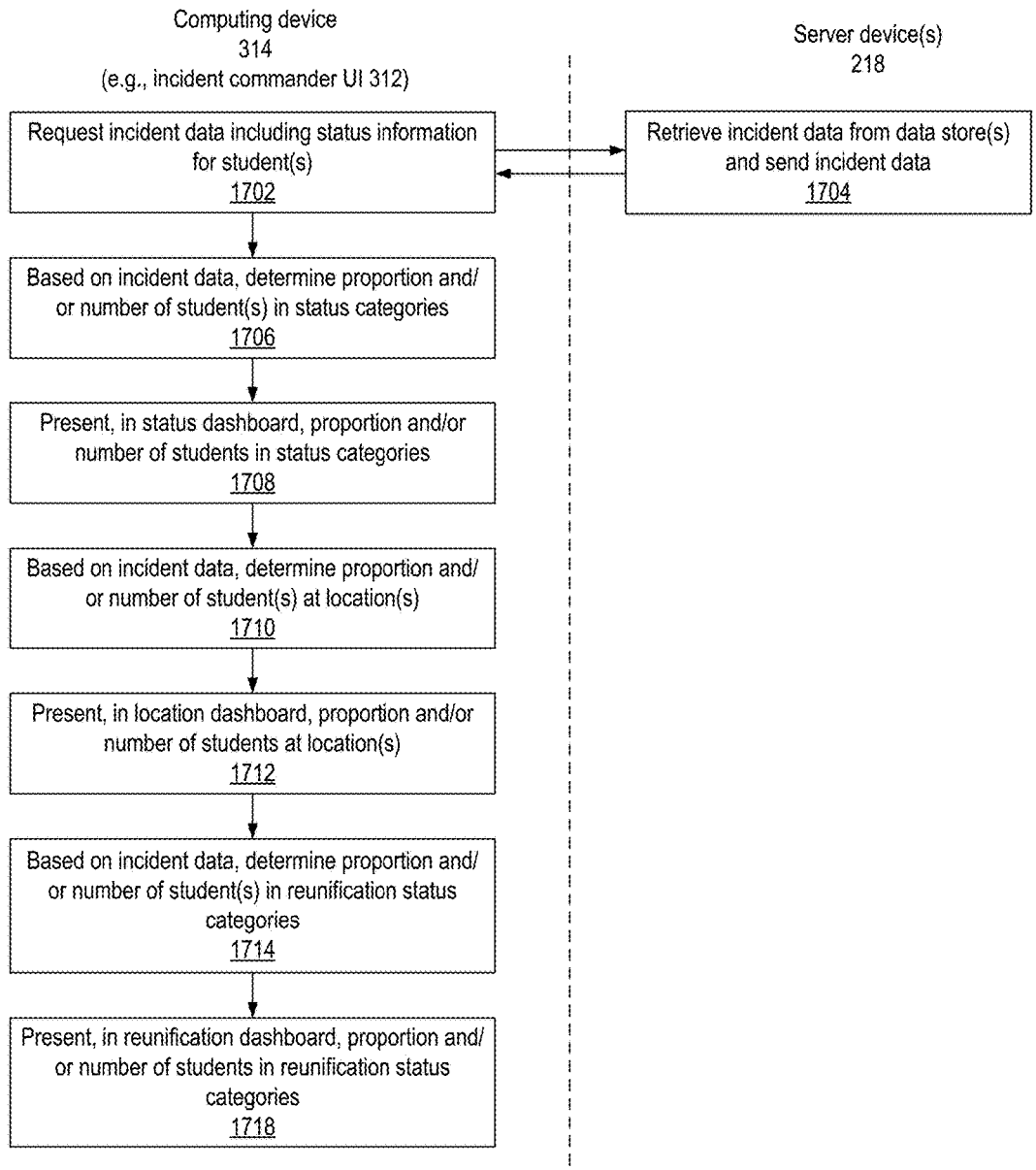
FIG. 17 depicts an example process that may be executed with regard to an incident commander user interface, in accordance with implementations of the present disclosure.

FIG. 17 depicts an example process that may be executed with regard to the incident commander UI 312, in accordance with implementations of the present disclosure. Operations of the process may be performed by the one or more of the application(s) 316, the incident management service 232, or other software executing on the computing device(s) 314, the server device(s) 218, or elsewhere.

The application 316 may request (1702) incident data 222 including status information for students or other individuals. In response to the request, the incident management service 232 may retrieve (1704) the incident data 222 from the data store(s) 220 and send the incident data 222 to the application 316.

Based on the incident data 222 received, the application 316 may calculate or otherwise determine (1706) the proportion, the number, or both the proportion and number of student(s) in various status categories as described above. The application 316 may present (1708) the determined proportion(s) and/or number(s) of students in the status dashboard of the incident commander UI 312.

Based on the incident data 222 received, the application 316 may calculate or otherwise determine (1710) the proportion, the number, or both the proportion and number of student(s) at various locations as described above. The application 316 may present (1712) the determined proportion(s) and/or number(s) of students in the location dashboard of the incident commander UI 312.

Based on the incident data 222 received, the application 316 may calculate or otherwise determine (1714) the proportion, the number, or both the proportion and number of student(s) in various reunification statuses as described above. The application 316 may present (1716) the determined proportion(s) and/or number(s) of students in the reunification dashboard of the incident commander UI 312.

Figure 18:
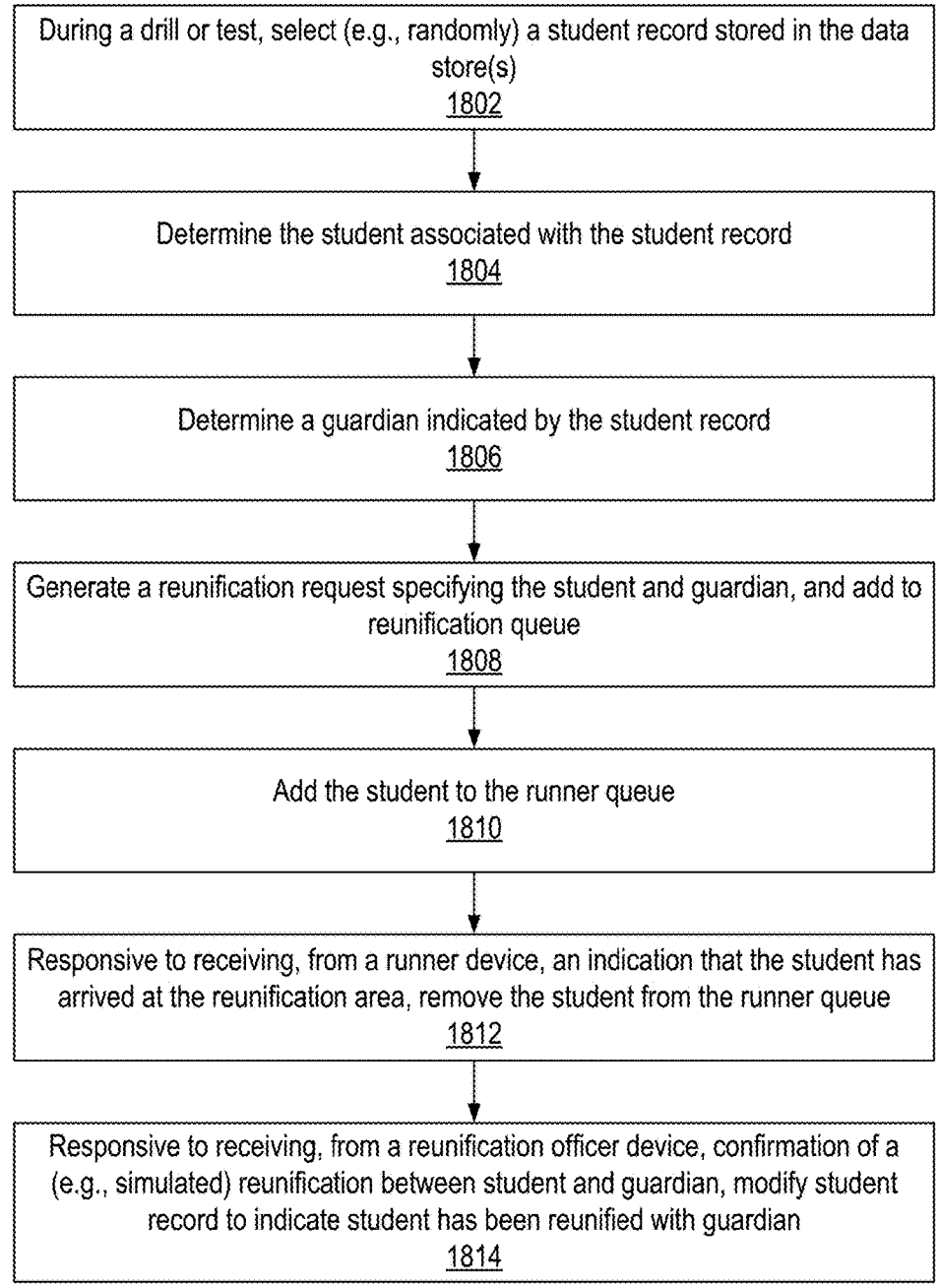
FIG. 18 depicts an example process that may be executed as part of a drill or test of an emergency response system, in accordance with implementations of the present disclosure.

FIG. 18 depicts an example process that may be executed as part of a drill or test, in accordance with implementations of the present disclosure. Operations of the process may be performed by the one or more of the application(s) 316, the incident management service 232, or other software executing on the computing device(s) 314, the server device(s) 218, or elsewhere.

During a drill or test, a student record may be selected (1802) from the data store(s) 220. In some implementations, the selection of the student record may be based on the result of a random, or pseudo-random, selection algorithm. The particular student associated with the selected student record may be determined (1804). A guardian may also be determined (1806), such as one of the guardian(s) of the student as indicated in the student record.

A reunification request may be generated (1808) and added to the reunification queue 230 as described above. In some cases, a record may also be added (1810) to the runner queue 228 to indicate that the student is to be escorted to the reunification area.

In response to receiving an indication that the student has arrived at the reunification area, the record may be removed (1812) from the runner queue 228 as described above.

In response to receiving a confirmation of a reunification between student and guardian, the student record of the student may be modified (1814) to indicate the student has been reunified with the guardian. The reunification record may also be modified or removed to indicate the reunification has occurred. In a drill situation, the reunification may be a simulated reunification to enable the drill to be executed without the need for guardian(s) to be present. By electronically tracking and presenting the reunification status for students using the UIs described herein, implementations enable simulated reunifications in a drill or test scenario without the presence of guardians. Moreover, by providing a set of UIs for presenting reunification information based on a reunification procedure, implementations provide a reunification procedure (e.g., a best practice approach) that schools or other institutions may use if they do not currently have a reunification procedure in place.

Although the examples herein describe tracking the status and location of individuals such as students, response personnel (e.g., student supervisor(s) 102, location supervisor(s) 104, etc.), and guardians, implementations are not so limited. In some implementations, the application 316 and various UIs described herein may include functionality to enable the entry, storage, and presentation of information describing the location, identify, and status of other individuals present in the incident area, including but not limited to visitors, vendors, volunteers, other emergency responders, repair technicians, media representatives, and so forth.

Implementations enable the collection, presentation, and analysis of real-time incident information viewable by the incident commander 112 or other personnel regardless of their location. For example, using the incident commander UI, a user may view status information describing the number or proportion of students in various locations (e.g., student holding area, guardian greeter desk, reunification area, etc.), and such status information may be current and updated dynamically in real time during the handling of an incident. Moreover, the information may be stored and accessed (e.g., after the incident) for analysis, auditing, reporting, quality control, and so forth. For example, the data may be accessed later and analyzed to determine how the incident response may be improved, which aspects of the response effect were successful, which aspects were unsuccessful, and so forth.

In some implementations, the incident management service 232, the application(s) 316, or both may be integrated with other management system(s) or may interface with other management system(s). The other management system(s) may store and provide data that is accessible by the application(s) 316 or the incident management service 232 and that may be presented in one or more of the UIs described herein. In some cases, the data from other management system(s) may include a description of current volunteers, visitors, vendors, or other individuals who are present at the incident area 100. Such data may be received from the other management system(s) and presented in one or more of the UIs described herein.

Some implementations may include the accountability tracking functionality and omit the reunification functionality. For example, some implementations may include accountability features that indicate the location and status of students or other individuals, and that track which students are accounted for and which are not accounted for. Such implementations may be used, for example, for tracking the location and status of students during a fire or natural disaster, when the reunification of students with guardians may not be needed. Such implementations may also be used in a drill to test the response to a fire or natural disaster. For example, during a fire or natural disaster response or drill, personnel may employ the student supervisor UI 302 to account for students, and the incident commander 112 may employ the incident commander UI 312 to keep track who which students have been accounted for and while are still missing. Implementations may also be employed in other types of emergency response scenarios, or in drills, tests, or simulations for any emergency response scenarios.

The systems described herein may be used to manage the release of students under various conditions, including but not limited to: daily release, controlled release, or reunification. Daily release may include what happens every day at schools, e.g., the procedure to let the students free. Some students may walk into the neighborhood. Others may be transported by school buses or contracted buses. Others may take public transportation. Some may be picked up by parents or other guardians. A controlled release generally occurs at a different time than the daily release. A controlled release could be weather related, an early closing the school, a hazmat incident (e.g., chemical spill, etc.), or other situation. The release of students in a controlled release may be similar to a daily release, with the difference that students may be sent home at an unusual time because of an unusual but not necessarily a traumatic event. Reunification may occur when events at the school or in the neighborhood create a need for students to be physically returned to parents, such as in an emergency situation. In the event of criminal activity, injury, or death, additional time may be needed for law enforcement interviews or crisis counseling.

The system described herein also support various reunification process methods employed during a reunification release type, including but not limited to direction reunification, standard reunification, or multi-staging reunification. Direct reunification may be used in situations where the school performing the reunification is smaller (e.g., less than 300 students). The number of faculty members employed to reunite families may be minimal in such cases, or the location or situation of reunification may not require multiple staging areas (such as separate areas for student holding, guardian holding, and reunification). Students may be held in a singular staging area where they wait with their teachers or other student supervisors. Direct reunification may involve a greeting station where guardians are validated as authorized per (e.g., SIS) emergency card records. Students may then be requested to be sent from the student staging area to the guardians where they are to be released by faculty.

The standard reunification method may utilize a dual gate concept. This process may utilize a greeting station where guardians are greeted and validated as authorized per (e.g., SIS) emergency card records. Authorized guardians are then directed to a separate reunification area where they will wait to be reunified with their student(s). Students are held in a staging area, separated from the greeting and reunification areas, with no lines of sight between the staging area and the greeting or reunification areas. A runner is used to retrieve the requested student based on the completion of the greeting process as described above. A runner escorts the student(s) to the reunification area where the guardian and student(s) are reunified and the student(s) are released.

The multi-staging reunification approach may be a more complicated process than direct or standard reunification, but it may represent an optimal method for reunification by keeping the situation organized, keeping status and communications up-to-date, and minimizing anxiety and stress for students and guardians. Students are held in one or more staging areas where they wait with student supervisors (e.g., teachers) or other faculty and staff Arriving guardians are directed to a greeting station where they are validated as authorized per (e.g., SIS) emergency card records as described above. Following the validation of a guardian as authorized, a reunification request is generated and the guardian is instructed to go to a guardian staging area. In some cases, the student being requested has not arrived at the reunification area yet or is not currently present in the student holding area. In such cases, the guardian is instructed as to the current status of the situation but the reunification request may be put into a holding queue where it will wait until the student is checked into the student staging area. If the student being requested is in the student staging area, then the reunification request is delivered to the student runner queue to request retrieval of the student. When the request has been delivered to the student runner queue, a request may be sent to a guardian runner queue to prompt a guardian runner to retrieve the authorized guardian from the guardian staging area. The student runner and guardian runner then meet at a (e.g., centralized) reunification area where, under the supervision of a reunification officer, the reunification process is completed. This process provides sensitivity to both students and guardians alike, providing an organized approach that maintains an appropriate level of separation and intimacy.

Figure 19:
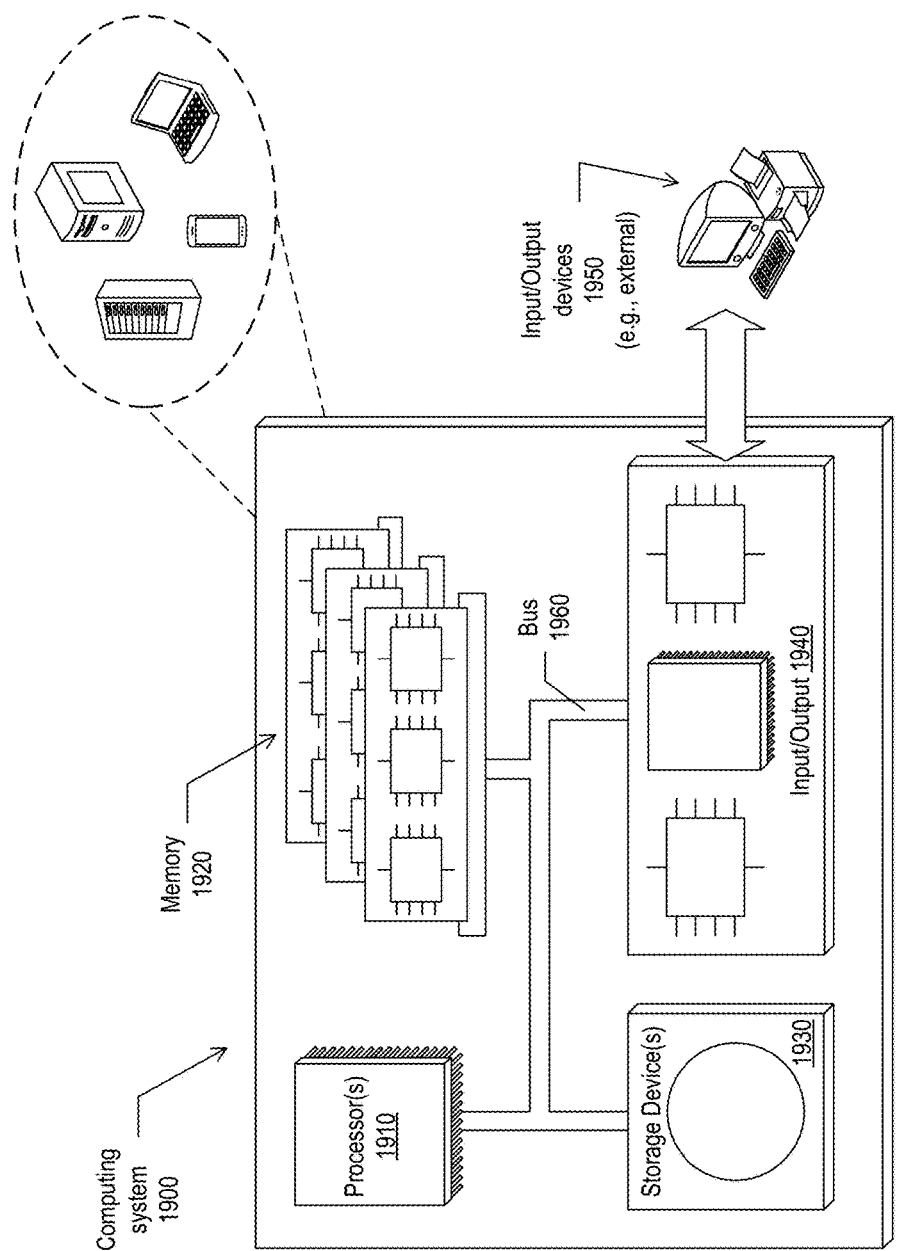
FIG. 19 depicts an example computing system architecture in accordance with implementations of the present disclosure.

FIG. 19 depicts an example computing system 1900 in accordance with implementations such as those of the present disclosure. The system 1900 may be used for any of the operations described with respect to the various implementations discussed herein. For example, the system 1900 may be included, at least in part, in one or more of the computing devices 314 or the server device(s) 218 described herein. The system 1900 may include one or more processors 1910, a memory 1920, one or more storage devices 1930, and one or more input/output (I/O) devices 1950 controllable via one or more I/O interfaces 1940. Two or more of the components 1910, 1920, 1930, 1940, or 1950 may be interconnected via at least one system bus 1960, which may enable the transfer of data between the various modules and components of the system 1900.

The processor(s) 1910 may be configured to process instructions for execution within the system 1900. The processor(s) 1910 may include single-threaded processor(s), multi-threaded processor(s), or both. The processor(s) 1910 may be configured to process instructions stored in the memory 1920 or on the storage device(s) 1930. The processor(s) 1910 may include hardware-based processor(s) each including one or more cores. The processor(s) 1910 may include general purpose processor(s), special purpose processor(s), or both.

The memory 1920 may store information within the system 1900. In some implementations, the memory 1920 includes one or more computer-readable media. The memory 1920 may include any number of volatile memory units, any number of non-volatile memory units, or both volatile and non-volatile memory units. The memory 1920 may include read-only memory, random access memory, or both. In some cases, the memory 1920 may be employed as active or physical memory by one or more executing software modules.

The storage device(s) 1930 may be configured to provide (e.g., persistent) mass storage for the system 1900. In some implementations, the storage device(s) 1930 may include one or more computer-readable media. For example, the storage device(s) 1930 may include a floppy disk device, a hard disk device, an optical disk device, or a tape device. The storage device(s) 1930 may include read-only memory, random access memory, or both. The storage device(s) 1930 may include one or more of an internal hard drive, an external hard drive, or a removable drive. The storage device(s) 1930 may implement the data store(s) 220.

One or both of the memory 1920 or the storage device(s) 1930 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1900. In some implementations, the CRSM may include a data store that provides storage of computer-readable instructions or other information in a non-transitory format. The CRSM may be incorporated into the system 1900 or may be external with respect to the system 1900. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some cases, the processor(s) 1910 and the memory 1920 may be supplemented by, or incorporated into, one or more application-specific integrated circuits (ASICs).

The system 1900 may include one or more I/O devices 1950. The I/O device(s) 1950 may include one or more input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 1950 may also include one or more output devices such as a display, LED(s), an audio output device (e.g., a speaker), a printer, a haptic output device, and so forth. The I/O device(s) 1950 may be physically incorporated in one or more computing devices of the system 1900, or may be external with respect to one or more computing devices of the system 1900.

The system 1900 may include one or more I/O interfaces 1940 to enable components or modules of the system 1900 to control, interface with, or otherwise communicate with the I/O device(s) 1950. The I/O interface(s) 1940 may enable information to be transferred in or out of the system 1900, or between components of the system 1900, through serial communication, parallel communication, or other types of communication. For example, the I/O interface(s) 1940 may comply with a version of the RS-232 standard for serial ports, or with a version of the IEEE 1284 standard for parallel ports. As another example, the I/O interface(s) 1940 may be configured to provide a connection over Universal Serial Bus (USB) or Ethernet. In some cases, the I/O interface(s) 1940 may be configured to provide a serial connection that is compliant with a version of the IEEE 1394 standard.

The I/O interface(s) 1940 may also include one or more network interfaces that enable communications between computing devices in the system 1900, or between the system 1900 and other network-connected computing systems. The network interface(s) may include one or more network interface controllers (NICs) or other types of transceiver devices configured to send and receive communications over one or more networks, such as the network(s) 214, using any network protocol.

Computing devices of the system 1900 may communicate with one another, or with other computing devices, using one or more networks such as the network(s) 214. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1900 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some cases, a computing device may include one or more of a virtual computing environment, a hypervisor, an emulation, or a virtual machine executing on one or more physical computing devices. In some cases, two or more computing devices may include a cluster, cloud, farm, or other grouping of multiple devices that coordinate operations to provide load balancing, failover support, parallel processing capabilities, shared storage resources, shared networking capabilities, or other aspects.

The features described may be implemented in digital electronic circuitry or in computer hardware, software, or any combinations of hardware and software. The features may be implemented in at least one computer program product that is tangibly embodied in an information carrier (e.g., a machine-readable storage device) for execution by a programmable processor. The method or process steps may be performed by a programmable processor executing instructions to perform functions of the described implementations by operating on input data and generating output. The described features may be implemented in one or more computer programs that are executable on a programmable system including at least one programmable processor coupled to receive data and instructions from, and to transmit data and instructions to, a data storage system, at least one input device, and at least one output device. A computer program may include a set of instructions that can be used, directly or indirectly, in a computer to perform a certain activity or bring about a certain result. A computer program may be written in any form of programming language, including compiled or interpreted languages, and it may be deployed in any form, including as a stand-alone program or as a module suitable for use in a computing environment.

The logic flows depicted in the figures do not require the particular order shown, or any particular sequential order, to achieve desirable results. In some implementations, other steps may be provided or steps may be eliminated from the described flows. Moreover, the steps may be performed in parallel or serially with respect to other steps. The systems depicted in the figures do not require the particular components, or the particular arrangement of components, shown in the figures. In some implementations, the various systems may include more or fewer components than shown in the figures, and components may be arranged differently to achieve desirable results. Accordingly, implementations other than those explicitly depicted in the figures or described herein are within the scope of the following claims.

Although the example UIs herein may include various elements in an example arrangement, implementations are not limited to these examples. Any of the UIs described herein, or the various screens thereof, may include any number of elements of any type, in any arrangement. UI elements may include any number of controls such as buttons, radio buttons, sliders, menus, lists, and so forth. UI elements may include any number of dialogs to enable entry of any type of information. A UI may be presented in a single screen, page, or window, or in multiple screens, pages, or windows. A UI may present information visually. A UI may also present information as audio output, haptic output (e.g., via movements of a device), or through other methods.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A system for managing reunification of students and guardians, the system comprising:
   at least one data store comprising student records; and
   a computing device in communication with the at least one data store, the computing device configured to perform operations comprising:
      presenting, in a runner user interface (UI) executing on the computing device, a first control that is usable to select a student described in the student records;
      based at least partly on a first action performed through the first control, presenting at least one runner screen in the runner UI, wherein the at least one runner screen indicates a name of the student to be escorted, a current location of the student to be escorted, a name of a guardian associated with the student to be escorted, an image of the guardian associated with the student to be escorted, a relationship between the guardian and the student to be escorted, and a name of a runner assigned to the student to be escorted;

responsive to a second action performed through a second control included in the at least one runner screen, altering the at least one runner screen to present a confirmation dialog to enable confirmation of an arrival of the student at a reunification area;

responsive to a third action performed through the confirmation dialog, altering the at least one runner screen to indicate one or more of: i) an arrival of the student at the reunification area, and ii) a handoff of the student to a reunification officer; and responsive to the third action performed through the confirmation dialog, sending a communication to cause the student to be removed from a runner list.

2. The system of claim 1, wherein:

the first action causes the runner UI to present the runner list including, for each respective student of one or more students described in the student records, a name of the respective student; and the at least one runner screen is presented in response to a selection of the student from the runner list.

3. The system of claim 2, wherein the runner list includes one or more students for which a reunification request has been received and for which a runner has not yet been assigned.

4. The system of claim 2, wherein the at least one data store is remote from the computing device.

5. The system of claim 2, wherein:

the runner list is presentable in multiple instances of the runner UI executing on multiple computing devices; and the runner list is communicated to the multiple computing devices by at least one server computing device that communicates with the at least one data store.

6. The system of claim 1, wherein the at least one runner screen further indicates a current status of the student.

7. The system of claim 6, wherein the current status of the student comprises at least one of the student is awaiting a runner assignment, a runner is assigned and the student is awaiting escort, the student is in transit, or the student is reunified with a guardian.

8. A computer-implemented method for managing reunification of students and guardians, the method performed by a computing device and comprising:

presenting, in a runner user interface (UI) executing on the computing device, a first control that is usable to select a student described in student records stored on at least one data store;

based at least partly on a first action performed through the first control, presenting at least one runner screen in the runner UI, wherein the at least one runner screen indicates a name of the student to be escorted, a current location of the student to be escorted, a name of a guardian associated with the student to be escorted, an image of the guardian associated with the student to be escorted, a relationship between the guardian and the student to be escorted, and a name of a runner assigned to the student to be escorted; and responsive to a second action performed through a second control included in the at least one runner screen, altering the at least one runner screen to present a confirmation dialog to enable confirmation of an arrival of the student at a reunification area;

responsive to a third action performed through the confirmation dialog, altering the at least one runner screen to indicate one or more of: i) an arrival of the student at the reunification area, and ii) a handoff of the student to a reunification officer; and responsive to the third action performed through the confirmation dialog, sending a communication to cause the student to be removed from a runner list.

9. The method of claim 8, wherein:

the first action causes the runner UI to present the runner list including, for each respective student of one or more students described in the student records, a name of the respective student; and the at least one runner screen is presented in response to a selection of the student from the runner list.

10. The method of claim 9, wherein the runner list includes one or more students for which a reunification request has been received and for which a runner has not yet been assigned.

11. The method of claim 9, wherein the at least one data store is remote from the computing device.

12. The method of claim 9, wherein:

the runner list is presentable in multiple instances of the runner UI executing on multiple computing devices; and the runner list is communicated to the multiple computing devices by at least one server computing device that communicates with the at least one data store.

13. The method of claim 8, wherein the at least one runner screen further indicates a current status of the student.

14. The method of claim 13, wherein the current status of the student comprises at least one of the student is awaiting a runner assignment, a runner is assigned and the student is awaiting escort, the student is in transit, or the student is reunified with a guardian.

15. One or more non-transitory computer-readable storage media storing instructions which, when executed, cause at least one processor to perform operations comprising:

presenting, in a runner user interface (UI) executing on a computing device, a first control that is usable to select a student described in student records stored on at least one data store;

based at least partly on a first action performed through the first control, presenting at least one runner screen in the runner UI, wherein the at least one runner screen indicates a name of the student to be escorted, a current location of the student to be escorted, a name of a guardian associated with the student to be escorted, an image of the guardian associated with the student to be escorted, a relationship between the guardian and the student to be escorted, and a name of a runner assigned to the student to be escorted;

responsive to a second action performed through a second control included in the at least one runner screen, altering the at least one runner screen to present a confirmation dialog to enable confirmation of an arrival of the student at a reunification area;

responsive to a third action performed through the confirmation dialog, altering the at least one runner screen to indicate one or more of: i) an arrival of the student at the reunification area, and ii) a handoff of the student to a reunification officer; and responsive to the third action performed through the confirmation dialog, sending a communication to cause the student to be removed from a runner list.

16. The one or more non-transitory computer-readable storage media of claim 15, wherein:
   the first action causes the runner UI to present the runner list including, for each respective student of one or more students described in the student records, a name of the respective student; and
   the at least one runner screen is presented in response to a selection of the student from the runner list.

17. The one or more non-transitory computer-readable storage media of claim 16, wherein the runner list includes one or more students for which a reunification request has been received and for which a runner has not yet been assigned.

18. The one or more non-transitory computer-readable storage media of claim 16, wherein the at least one data store is remote from the computing device.

19. The one or more non-transitory computer-readable storage media of claim 16, wherein:
   the runner list is presentable in multiple instances of the runner UI executing on multiple computing devices; and
   the runner list is communicated to the multiple computing devices by at least one server computing device that communicates with the at least one data store.

20. The one or more non-transitory computer-readable storage media of claim 15, wherein the at least one runner screen further indicates a current status of the student.

* * * * *